(12) United States Patent
Tanaka et al.

(10) Patent No.: US 9,876,601 B2
(45) Date of Patent: Jan. 23, 2018

(54) OPTICAL TRANSMISSION SYSTEM, CONTROLLER FOR WAVELENGTH TUNABLE FILTER, AND CONTROL METHOD OF WAVELENGTH TUNABLE FILTER

(71) Applicant: FUJITSU LIMITED, Kawasaki-shi, Kanagawa (JP)

(72) Inventors: Toshiki Tanaka, Setagaya (JP); Ryou Okabe, Shinagawa (JP); Tomoo Takahara, Kawasaki (JP); Masato Nishihara, Kawasaki (JP); Yutaka Kai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/264,894

(22) Filed: Sep. 14, 2016

(65) Prior Publication Data

US 2017/0093515 A1 Mar. 30, 2017

(30) Foreign Application Priority Data

Sep. 24, 2015 (JP) .................. 2015-187233

(51) Int. Cl.
*H04J 14/02* (2006.01)
*H04B 10/564* (2013.01)

(52) U.S. Cl.
CPC ........ *H04J 14/0221* (2013.01); *H04B 10/564* (2013.01)

(58) Field of Classification Search
CPC .... H04J 14/0221; H04J 14/02; H04J 14/0246; H04B 10/07955; H04B 10/07953;
(Continued)

(56) References Cited

U.S. PATENT DOCUMENTS

2002/0075546 A1  6/2002 Webb
2002/0171900 A1  11/2002 Ono et al.
(Continued)

FOREIGN PATENT DOCUMENTS

JP   11-205240   7/1999
JP   2001-264710  9/2001
JP   2002-258228  9/2002

OTHER PUBLICATIONS

F. Devaux et al., "Simple Measurement of Fiber Dispersion and of Chirp Parameter of Intensity Modulated Light Emitter", Journal of Lightwave Technology, vol. 11, No. 12, pp. 1937-1940, Dec. 1993.

*Primary Examiner* — Don N Vo
(74) *Attorney, Agent, or Firm* — Staas & Halsey LLP

(57) ABSTRACT

There is proved an optical transmission system including: a transmitter configured to transmit an optical signal modulated with a discrete multi-tone (DMT) drive signal; a filter capable of changing a wavelength of the optical signal input from the transmitter; a monitor configured to monitor a power of the optical signal passed through the filter; and at least one processor configured to: set a center wavelength of the filter, shift the center wavelength, detect a change in the power monitored by the monitor, identify a carrier component of the optical signal based on the change in the power, and control a relative relationship between a transmission characteristic of the filter and a wavelength of the carrier component so that the carrier component is included in the optical signal and one of an upper sideband and a lower sideband of the optical signal is at least partially removed by the filter.

20 Claims, 18 Drawing Sheets

(58) Field of Classification Search
CPC ............... H04B 10/572; H04B 10/675; H04B 10/0775; G02B 6/29395; H04Q 2011/0083; H04Q 2011/0009
USPC .......................................................... 398/78
See application file for complete search history.

(56) References Cited

U.S. PATENT DOCUMENTS

| | | | |
|---|---|---|---|
| 2003/0123789 A1* | 7/2003 | Miyata | H04B 10/25073 385/24 |
| 2010/0142956 A1* | 6/2010 | Larikova | H04B 10/2507 398/79 |
| 2013/0089324 A1* | 4/2013 | Eiselt | H04B 10/40 398/34 |
| 2016/0020853 A1* | 1/2016 | Akiyama | H04B 10/07955 398/38 |

* cited by examiner

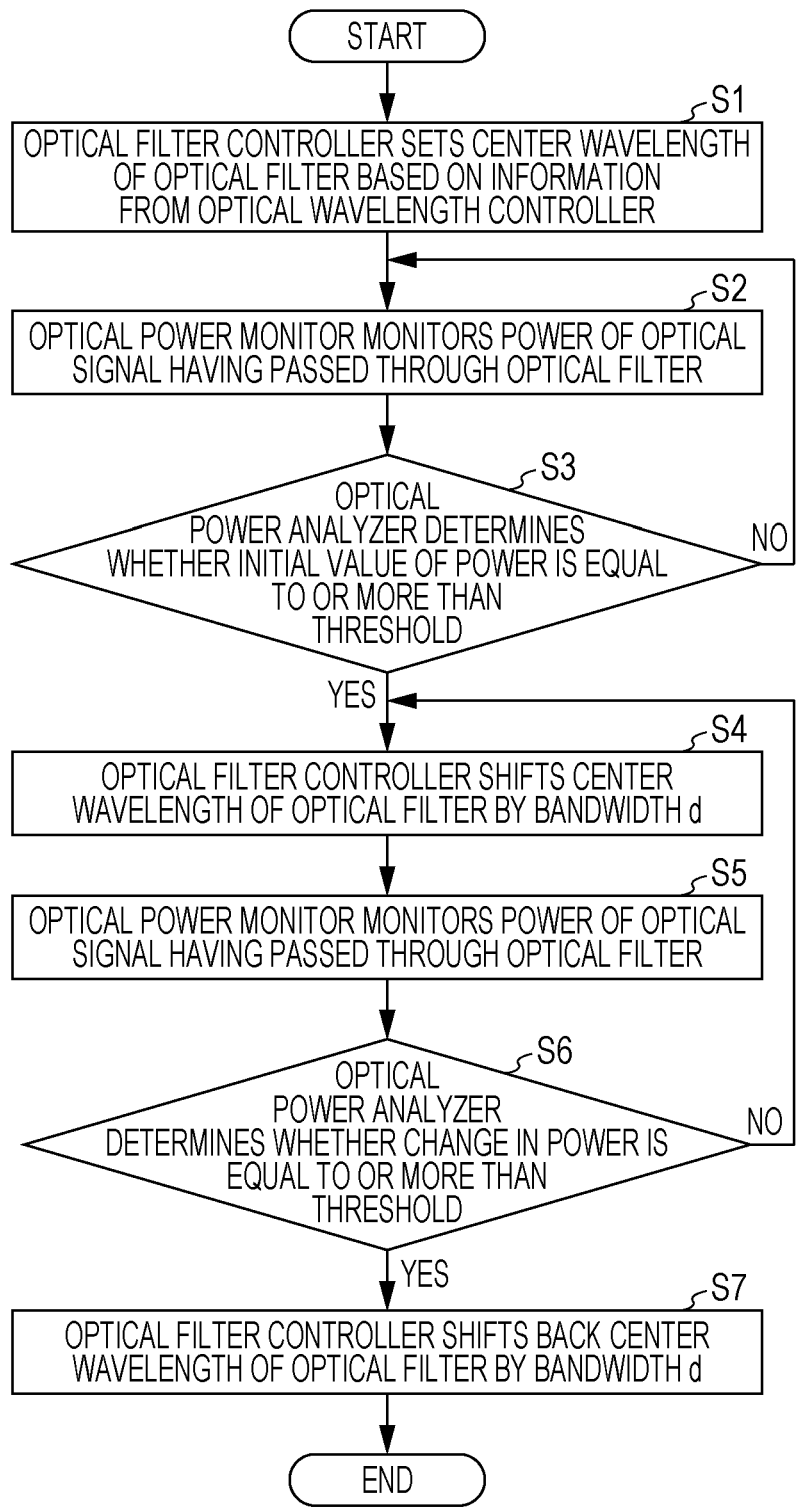

OPTICAL TRANSMISSION SYSTEM, CONTROLLER FOR WAVELENGTH TUNABLE FILTER, AND CONTROL METHOD OF WAVELENGTH TUNABLE FILTER

CROSS-REFERENCE TO RELATED APPLICATION

This application is based upon and claims the benefit of priority of the prior Japanese Patent Application No. 2015-187233, filed on Sep. 24, 2015, the entire contents of which are incorporated herein by reference.

Field

The embodiments discussed herein are related to an optical transmission system, a controller for a wavelength tunable filter, and a control method of the wavelength tunable filter.

Background

In recent years, application of a discrete multi-tone (DMT) modulation system to an optical transmission system has been under discussion because the DMT modulation system is considered as a technique of enhancing the efficiency of frequency usage in a simple configuration. The DMT modulation system is one of the multicarrier transmission techniques based on orthogonal frequency division (OFD) multiplexing, and is used in a digital subscriber line (DSL) technique such as an asymmetric digital subscriber line (ADSL).

The DMT modulation system (which may also be referred to as a "multicarrier modulation system") employs a method called "bit loading", where the number of bits assigned to each subcarrier depends on its transmission characteristic. The "transmission characteristic" may otherwise be referred to as "reception characteristic" or "signal quality".

Examples of the index for the transmission characteristic include a signal-to-noise ratio (SNR) and a bit error rate (BER). The transmission characteristic may also be referred to as a transmission condition. In the DMT modulation system, for example, more bits are assigned to a subcarrier with a higher transmission characteristic than to a subcarrier with a lower transmission characteristic. Hence, it is possible to enhance the efficiency of frequency usage within a transmission band and to increase the transmission capacity.

When the DMT modulation system is introduced to an optical transmission system, an electrical-to-optical (E/O) converter which employs a direct modulation system by a semiconductor laser may be applied to an optical transmitter. Meanwhile, an optical-to-electrical (O/E) converter which employs a photo-receiving element such as a photodetector or photodiode (PD) may be applied to an optical receiver.

Semiconductor lasers and PDs are general purpose optical devices and thus are inexpensive. Meanwhile, in the direct modulation system, a drive current for the semiconductor laser as a light source is modulated according to the transmission data to generate a modulation signal. As compared to an external modulation system which employs an optical modulator separate from the light source, the direct modulation system has difficulty in achieving higher transmission speed, but enables the optical transmitter to be small and cost thereof to be reduced because phase information on optical signals does not have to be used.

Hence, introducing the DMT modulation system to the optical transmission system enables an optical transmission system to be provided which enhances efficiency of frequency usage (in other words, enhances the transmission capacity) and enables an optical transmitter to be small and cost thereof to be reduced.

A wavelength selective switch (WSS) capable of selectively transmitting a desired wavelength may be applied to an optical transmission system in some cases. The WSS is an example of a wavelength tunable optical filter. By applying a wavelength tunable optical filter to an optical transmission system, it is possible to flexibly change setting of wavelength paths in an optical network and thus to enhance efficiency of using wavelength resources.

Examples of the related art techniques are disclosed, for example, in Japanese Laid-open Patent Publication Nos. 11-205240, 2001-264710, and 2002-258228.

F. Devaux et al., "Simple Measurement of Fiber Dispersion and of Chirp Parameter of Intensity Modulated Light Emitter", JOURNAL OF LIGHTWAVE TECHNOLOGY, VOL 11, No. 12, December 1993, pp. 1937-40 is an example of non-patent literature.

SUMMARY

According to an aspect of the invention, an optical transmission system includes: an optical transmitter configured to transmit an optical signal modulated with a discrete multi-tone (DMT) drive signal; a wavelength tunable filter capable of changing a wavelength of the optical signal input from the optical transmitter; a power monitor configured to monitor a power of the optical signal passed through the wavelength tunable filter; and at least one processor configured to: set a center wavelength of the wavelength tunable filter, shift the center wavelength, detect a change in the power monitored by the power monitor, identify an optical main carrier component of the optical signal based on the change in the power, and control a relative relationship between a transmission characteristic of the wavelength tunable filter and a wavelength of the optical main carrier component so that the optical main carrier component is included in the optical signal and one of an upper sideband and a lower sideband of the optical signal is at least partially removed by the wavelength tunable filter.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a flowchart describing an example of controlling the optical filter in the optical transmission system according to the first embodiment;

DESCRIPTION OF EMBODIMENTS

Figure 1:
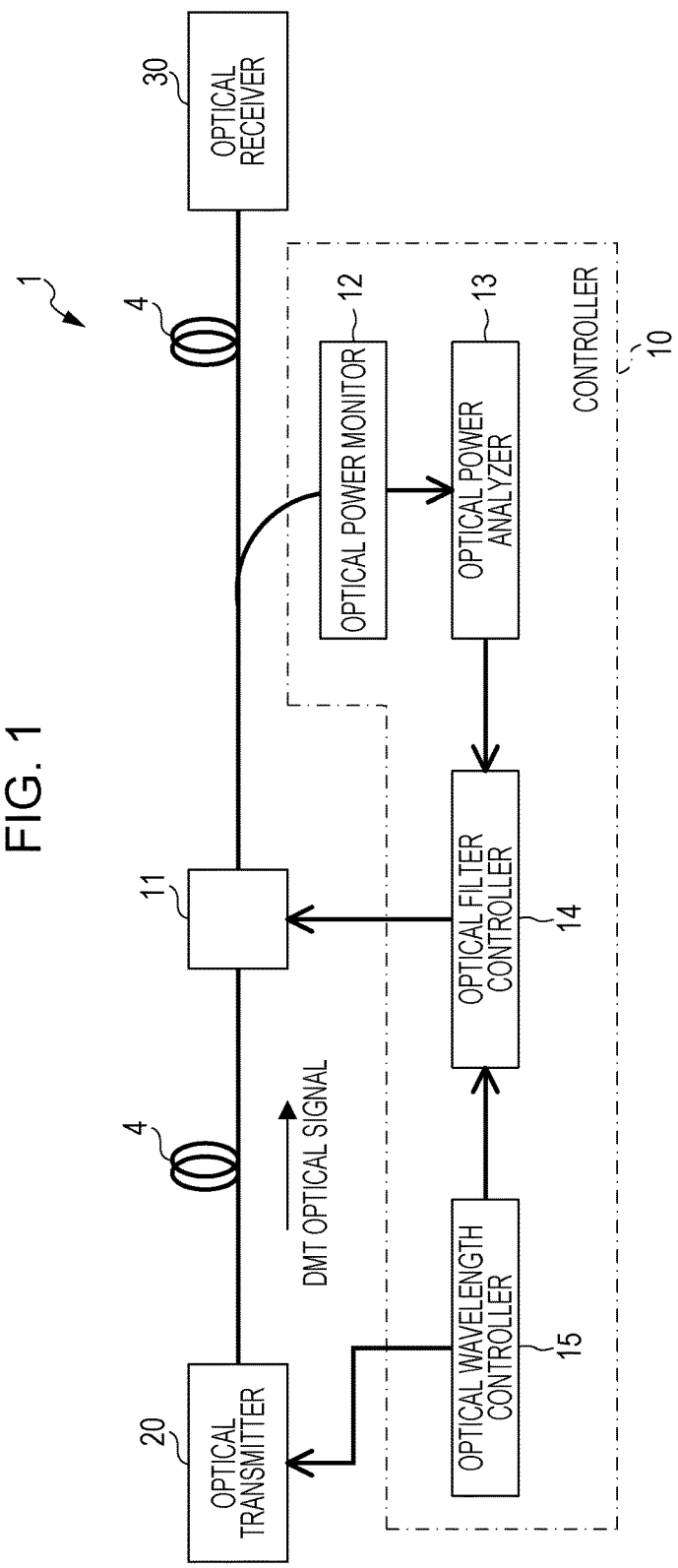
FIG. 1 is a block diagram illustrating an example of a functional configuration of an optical transmission system according to a first embodiment.

In an optical transmission system using an optical intensity modulation system, the transmission characteristic may deteriorate due to interaction of a frequency chirp occurring in the optical transmitter and chromatic dispersion accumulated in an optical transmission line.

Hereinbelow, with reference to the drawings, embodiments will be described of a technique of reducing deterioration of a transmission characteristic in an optical transmission system. Note that the embodiments discussed below are mere examples, and are provided without the intension of excluding various modifications and applications of techniques unspecified in the embodiments. In other words, the present embodiments may be applied with modifications in various forms within a scope not deviating from the gist of the present disclosure.

Meanwhile, the drawings do not mean that only components illustrated in the drawings are included; different components may be included. Hereinbelow, in the drawings, parts assigned identical reference numerals indicate identical or similar parts unless otherwise noted.

First Embodiment

[Example of System Configuration]

FIG. 1 is a block diagram illustrating an example of a functional configuration of an optical transmission system 1 according to a first embodiment.

The optical transmission system 1 illustrated in FIG. 1 may include an optical transmitter 20 and an optical receiver 30, for example. The optical transmitter 20 and the optical receiver 30 may be connected to each other via an optical transmission line 4 made of an optical transmission medium such as an optical fiber. The optical transmission line 4 may be a single mode fiber (SMF). Note that the optical transmission line 4 may be provided with one or more optical amplifiers.

In the optical transmission system 1, the optical transmission line 4 may be provided with a wavelength tunable optical filter 11 (which may simply be referred to as "optical filter 11" hereinafter). The optical filter 11 may be capable of changing the wavelength of an optical signal passing therethrough, and may receive input of optical signals such as a DMT optical signal transmitted by the optical transmitter 20. When a WSS is used as the optical filter 11, the optical filter 11 may use a feature of the WSS, that is, an ability to change a transmission characteristic of the WSS.

The optical filter 11 may be a bandpass filter which imposes a bandwidth limit on both a short-wavelength side and a long-wavelength side of a center wavelength of an inputted optical signal, or a high-pass filter or a low-pass filter which imposes bandwidth limit on only one of the short-wavelength side and the long-wavelength side.

The optical filter 11 is not limited to the bandpass filter; even if using the high-pass filter or the low-pass filter, the optical filter 11 is able to remove or to extract at least partially any one of an upper sideband and a lower sideband, which are described later.

The optical transmission system 1 may include a controller 10 for the wavelength tunable optical filter 11 (which may simply be referred to as "controller 10" hereinafter). The controller 10 is connected to the optical transmitter 20 and to a path branching from the optical transmission line 4 between the optical filter 11 and the optical receiver 30. Here, a configuration example of the controller 10 will be described later with the explanation of FIGS. 9 to 11B.

Figure 2:
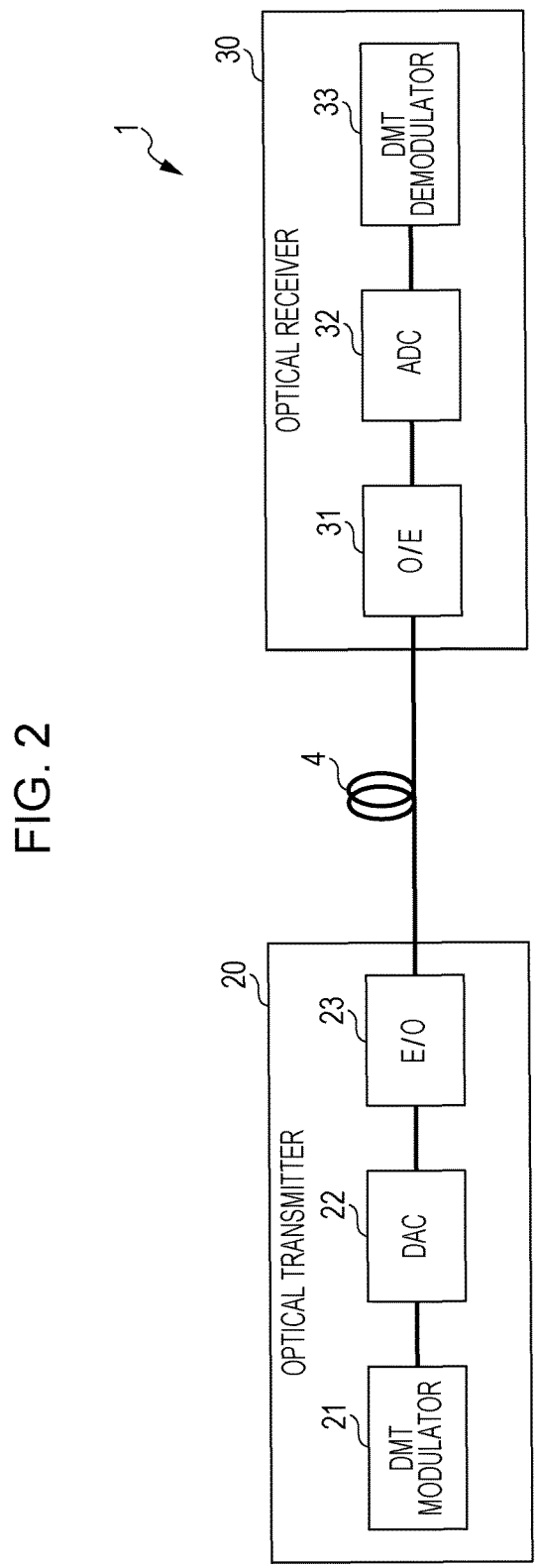
FIG. 2 is a block diagram illustrating examples of functional configurations of an optical transmitter and an optical receiver according to the first embodiment.

FIG. 2 is a block diagram illustrating examples of functional configurations of the optical transmitter 20 and the optical receiver 30 according to the first embodiment. Note that in FIG. 2, illustration of the optical filter 11 and the controller 10 depicted as an example in FIG. 1 is omitted.

[Optical Transmitter]

The optical transmitter 20 modulates transmission data using the DMT modulation system and the direct modulation system, and transmits the obtained transmission modulation optical signal to the optical transmission line 4, for example. In other words, the optical transmitter 20 may transmit an optical signal modulated according to a DMT drive signal. Note that the DMT modulation system is an example of a multicarrier modulation system. The transmission modulation optical signal may be referred to as a DMT modulation optical signal. The DMT modulation optical signal is an example of a multicarrier modulation optical signal.

The optical transmitter 20 may include a DMT modulator 21, a digital-to-analog converter (DAC) 22, and an electrical-to-optical conversion (E/O) module 23 may be included in the optical transmitter 20, for example.

The DMT modulator 21 is an example of a multicarrier modulator, and may generate a DMT modulation signal by DMT modulation of transmission data as an electrical signal. The DMT modulator 21, or a block including the DMT modulator 21, DAC 22, and E/O module 23 may be considered as an example of a transmission unit.

The DMT modulator 21 performs serial/parallel (S/P) conversion of a transmission signal (which may also be referred to as "transmission data") and generates some sets of parallel data the number of which corresponds to that of transmission subcarriers, for example. Also, the DMT modulator 21 may perform error correction coding on the generated parallel data. Moreover, the DMT modulator 21 may map the error-correction coded parallel data (digital bit strings) on a subcarrier basis to symbols in a complex plane (IQ-plane) called a "constellation" (this mapping may be referred to as "subcarrier modulation").

Figure 3A:
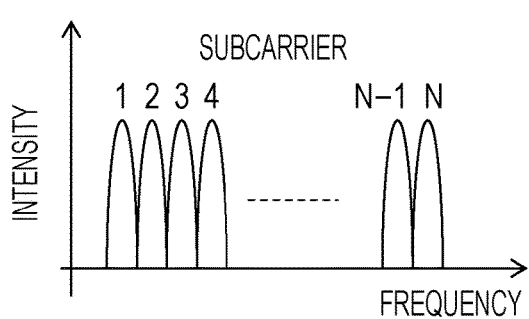
FIG. 3A is a diagram illustrating an example of an arrangement of subcarriers for DMT modulation optical signals.
Figure 3B:
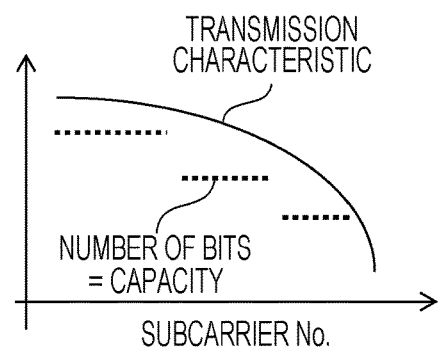
FIG. 3B is a diagram illustrating transmission characteristics of the subcarriers depicted in FIG. 3A.

FIG. 3A is a diagram illustrating an example of an arrangement of subcarriers for a DMT modulation optical signal, and FIG. 3B is a diagram illustrating a transmission characteristic of each of the subcarriers depicted in FIG. 3A.

FIG. 3A illustrates N (N is an integer equal to or more than 2) subcarriers set in a frequency domain. Here, 1 to N denote subcarrier numbers. In the example illustrated in FIG. 3A, a subcarrier with a larger subcarrier number has a higher frequency. Note that the subcarrier numbers may be assigned to the respective frequencies in any order.

The DMT modulator 21 may negotiate with the optical transmitter 20 and the optical receiver 30 before the transmission of a main signal, and assign each of the subcarriers with bits the number of which corresponds to the transmission characteristic of that subcarrier. An example of the index for the transmission characteristic is the SNR or the BER. As illustrated in FIG. 3B, for example, more bits may be assigned to one symbol for a subcarrier with a higher transmission characteristic (which may also be referred to as the "reception characteristic" or "signal quality") than for a subcarrier with a lower transmission characteristic in the DMT modulation system. In other words, in the DMT modulation system, more bits may be assigned to one symbol in the case of a subcarrier with a high transmission characteristic than in the case of a subcarrier with a low transmission characteristic.

Here, one may consider that the number of bits assigned corresponds to the multiplicity of the subcarrier modulation.

For example, in the case where the subcarrier modulation is quadrature phase shift keying (QPSK), the multiplicity is 4. In the case where the subcarrier modulation is M-quadrature amplitude modulation (M-QAM), the multiplicity is M (=16, 64, 256, and the like).

The description goes back to FIG. 2. The DAC 22 converts a DMT modulation signal, a digital signal generated by the DMT modulator 21, to an analog signal and inputs the analog DMT modulation signal to the E/O module 23, for example.

The E/O module 23 converts the DMT modulation signal inputted from the DAC 22 to an optical signal, for example. The E/O module 23 may include, for example, a light source and a driver which are omitted from the drawings. A block including the light source and the driver may be referred to as a transmitter optical sub-assembly (TOSA).

The driver provides the light source with a drive signal corresponding to an analog DMT modulation signal. In response to the drive signal, the light emission power of the light source changes and thus a DMT modulation optical signal is generated.

In other words, the E/O module 23 performs direct modulation (DM) of light outputted from the light source using the DMT modulation signal. The light source is a semiconductor laser, for example.

The DMT modulation optical signal generated by the E/O module 23 as described above is transmitted to the optical transmission line 4.

Here, the optical transmitter 20 may include an amplifier (not illustrated) provided between the DAC 22 and the E/O module 23 and configured to amplify signals.

[Optical Receiver]

Next, the optical receiver 30 illustrated in FIG. 2 will be described. The optical receiver 30 may include an optical-to-electrical (O/E) module 31, an analog-to-digital converter (ADC) 32, and a DMT demodulator 33, for example. Here, an amplifier (not illustrated) configured to amplify signals may be provided between the O/E module 31 and the ADC 32.

The O/E module 31 converts a received DMT modulation optical signal to an electrical signal, for example. To this end, the O/E module 31 may include a photodetector or photodiode (PD), which is an example of a photo-receiving element.

The PD converts the received DMT modulation optical signal to an electrical signal (for example, a current signal) having an amplitude corresponding to the power of the received light, for example. The current signal corresponding to the power of the light received by the PD may be converted to a voltage signal by a trans-impedance amplifier (TIA), for example. A block containing the PD and the TIA may be referred to as a receive optical subassembly (ROSA).

The ADC 32 converts the analog electrical signal photoelectrically converted from the optical signal by the O/E module 31 as described above, to a digital signal for example.

The DMT demodulator 33 obtains reception data by DMT modulation of an analog electrical signal inputted from the ADC 32, for example. Here, one may consider that the DMT demodulator 33, or the block containing the O/E module 31, the ADC 32 and the DMT demodulator 33 corresponds to an example of a reception unit.

In the DMT optical signal received by the optical receiver 30, a "drop in transmission characteristic" might occur in the frequency domain. The "drop in transmission characteristic" in the frequency domain may be referred to as a "frequency dip".

The "frequency dip" is caused depending on a parameter (a) for a frequency chirp applied to a transmission optical signal due to the frequency characteristic possessed by the light source of the optical transmitter 20, and on the dispersion of the DMT modulation signal passing through the optical transmission line 4, for example. A detailed description will be provided later with reference to FIGS. 4, 5, and the like. Note that, hereinbelow, the parameter α for the frequency chirp may be referred to as a "chirp parameter α" in short.

A frequency response $I_R$ of the DMT modulation optical signal transmitted through the optical transmission line 4 may be represented by Expression 1 below:

$$I_R = m\sqrt{1+\alpha^2}\left|\cos\left(\frac{\pi\lambda^2 DLf^2}{c}+\tan^{-1}(\alpha)\right)\right| \quad \text{[Expression 1]}$$

Note that in Expression 1, 'm' denotes the "degree of modulation", 'α' denotes the "chirp parameter" of the optical transmitter 20, and 'λ' denotes the "wavelength" of the DMT modulation optical signal. In addition, 'D' denotes the "dispersion", 'L' denotes the length of the transmission path 4 (which may otherwise be referred to as the "length of the optical fiber"), 'f' denotes the center wavelength of the frequency dip, and 'c' denotes the "speed of light".

Figure 4:
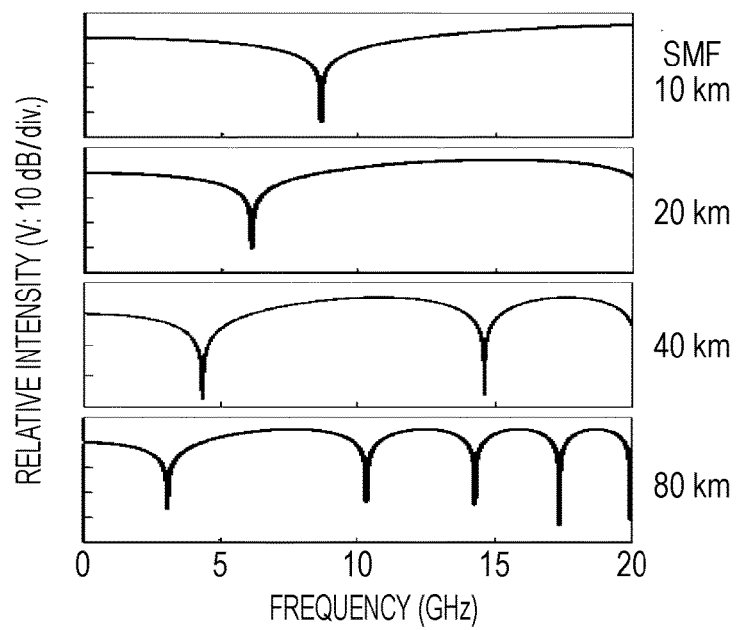
FIG. 4 illustrates examples of frequency-response characteristics of DMT modulation optical signals.

FIG. 4 provides diagrams illustrating examples of frequency-response characteristics (which may otherwise be referred to as the "transmission characteristic") of the DMT modulation optical signal.

FIG. 4 illustrates examples of the frequency-response characteristics for different lengths of optical fibers [km] (L=10, L=20, L=40, L=80) when the dispersion D=16 [ps/nm/km], the wavelength λ=1550 [nm], and the chirp parameter α=3.25 in Expression 1.

As can be understood from FIG. 4, the frequency-response characteristic of the DMT modulation optical signal changes depending on the length of the optical fiber L (in other words, the transmission distance of the DMT modulation optical signal). For example, FIG. 4 illustrates a tendency in which a larger transmission distance leads to an increase in the number of frequency dips which occur in the DMT transmission band.

Figure 5:
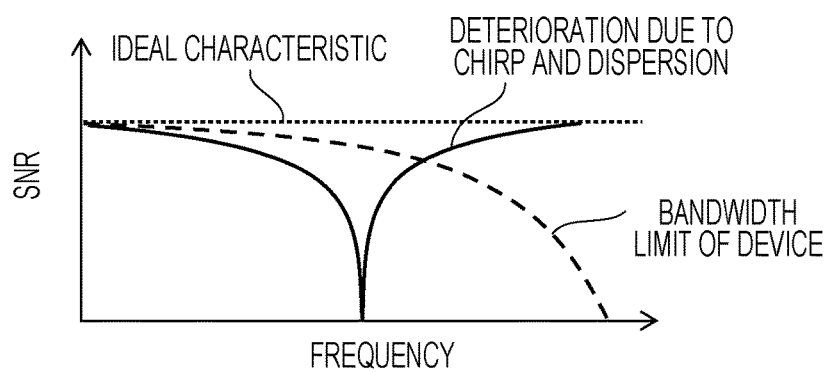
FIG. 5 is a diagram schematically indicating that a transmission characteristic of the DMT modulation optical signal deteriorates from an ideal characteristic.

FIG. 5 is a diagram schematically indicating that the transmission characteristic of the DMT modulation optical signal deteriorates from an ideal characteristic.

Ideally, the frequency-response characteristic of the DMT modulation optical signal in the DMT transmission band is flat, as illustrated in FIG. 5. However, a DMT modulation optical signal with higher frequency, for example, may be subject to, for example, a severer bandwidth limit due to the frequency characteristics of the optical devices employed in the optical transmitter 20 and the optical receiver 30, and thus the transmission characteristic of the DMT modulation optical signal tends to decrease.

In addition to the above-mentioned bandwidth limit, the chirp parameter α of the optical transmitter 20 and the dispersion of the DMT modulation optical signal caused by the optical transmission line 4 only allow each subcarrier to be assigned with transmission data with a smaller number of bits than the number of bits assignable in the case where there is no frequency dip.

Figure 6A:
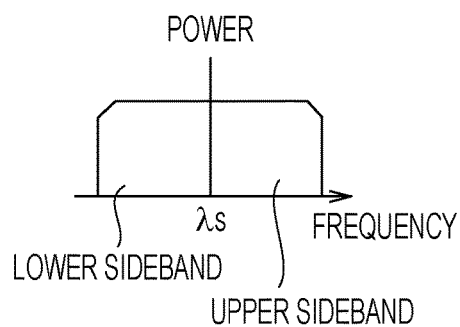
FIG. 6A is a diagram schematically illustrating a lower sideband and an upper sideband of an optical signal spectrum.
Figure 6B:
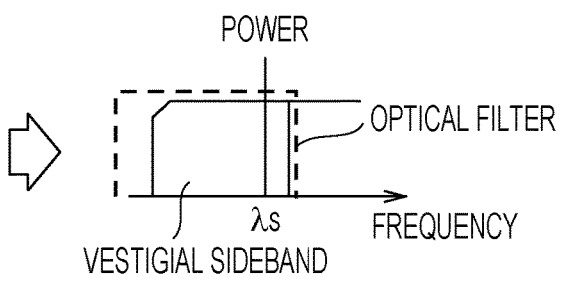
FIG. 6B is a diagram schematically illustrating a vestigial sideband of the optical signal spectrum depicted in FIG. 6A.

FIG. 6A is a diagram schematically illustrating a lower sideband and an upper sideband of an optical signal spectrum, and FIG. 6B is a diagram schematically illustrating a vestigial sideband of the optical signal spectrum depicted in FIG. 6A.

From a signal spectrum including a carrier frequency λs illustrated in FIG. 6A, one of the lower sideband and the upper sideband may be removed by the optical filter 11. Accordingly, as illustrated in FIG. 6B, the carrier frequency Xs remains in the vestigial sideband (VSB), and thus it is possible to reduce the deterioration of the transmission characteristic due to chromatic dispersion, as described below. Hereinafter, a "component of the carrier frequency" may be referred to as a "carrier component" or an "optical main carrier component".

Figure 7:
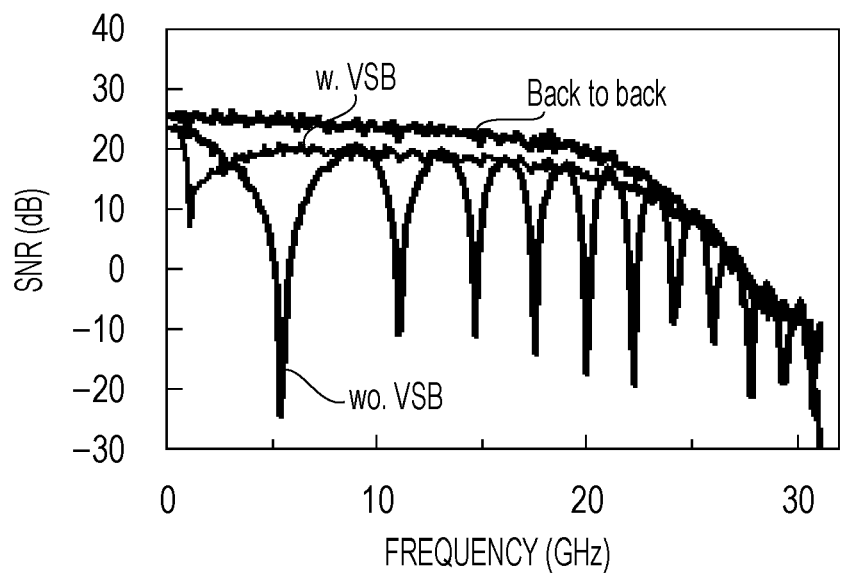
FIG. 7 is a diagram illustrating an example of an SNR of the DMT modulation optical signal.
Figure 8:
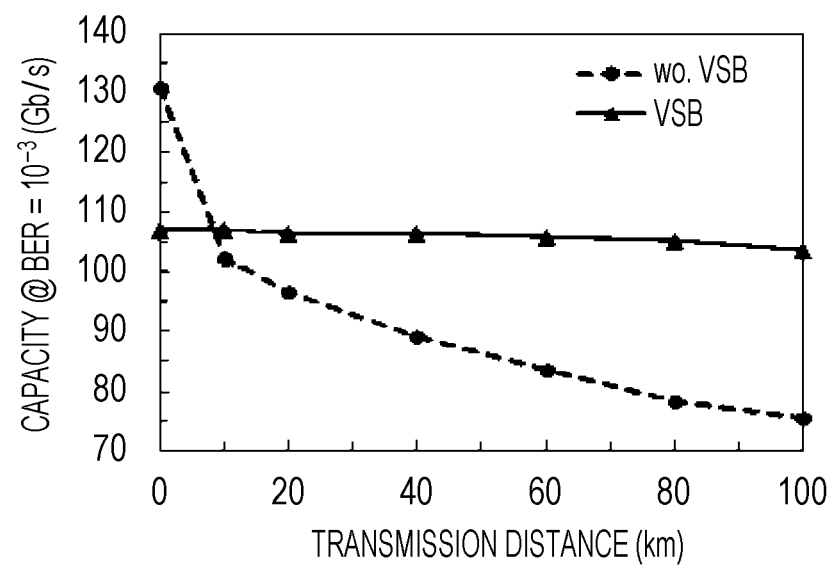
FIG. 8 is a diagram illustrating an example of a BER of the DMT modulation optical signal.

FIG. 7 is a diagram illustrating an example of an SNR of a DMT modulation optical signal, and FIG. 8 is a diagram illustrating an example of a BER of a DMT modulation optical signal.

In FIG. 7, "Back to back" indicates the SNR of the DMT modulation optical signal in the case where the optical transmitter 20 and the optical receiver 30 are connected back to back (in other words, in the case where the length of the optical fiber L=0 [km]). In addition, "w. VSB" indicates the SNR of the DMT modulation optical signal in the case where one sideband is removed, and "wo. VSB" indicates the SNR of the DMT modulation optical signal in the case where no sidebands are removed.

As can be understood from FIG. 7, it is possible to reduce more dips generated in the case of removing one sideband than in the case of removing no sidebands.

In FIG. 8, "wo. VSB" indicates the BER of the DMT modulation optical signal in the case where no sidebands are removed, and "VSB" indicates the BER of the DMT modulation optical signal in the case where one sideband is removed.

As can be understood from FIG. 8, it is possible to make the transmission speed less affected by the transmission distance in the case of removing one sideband than in the case of removing no sidebands.

[Controller]

Next, the controller 10 will be described. The controller 10 illustrated in FIG. 1 may include an optical power monitor 12, an optical power analyzer 13, an optical filter controller 14, and an optical wavelength controller 15, for example. The controller 10 may operate during a period in which the optical transmission system 1 is not in operation such as at a time of initial setting or calibration.

The optical wavelength controller 15 may set the wavelength (or frequency) of the optical signal to be emitted by the light source (not illustrated) of the E/O module 23 included in the optical transmitter 20. For example, the optical wavelength controller 15 may set the wavelength (or frequency) based on the input from the optical filter controller 14 described later and the input from an unillustrated external device.

A PD, for example, may be employed as the optical power monitor 12. The optical power monitor 12 may monitor the power of an optical signal having passed through the optical filter 11.

Figure 9:
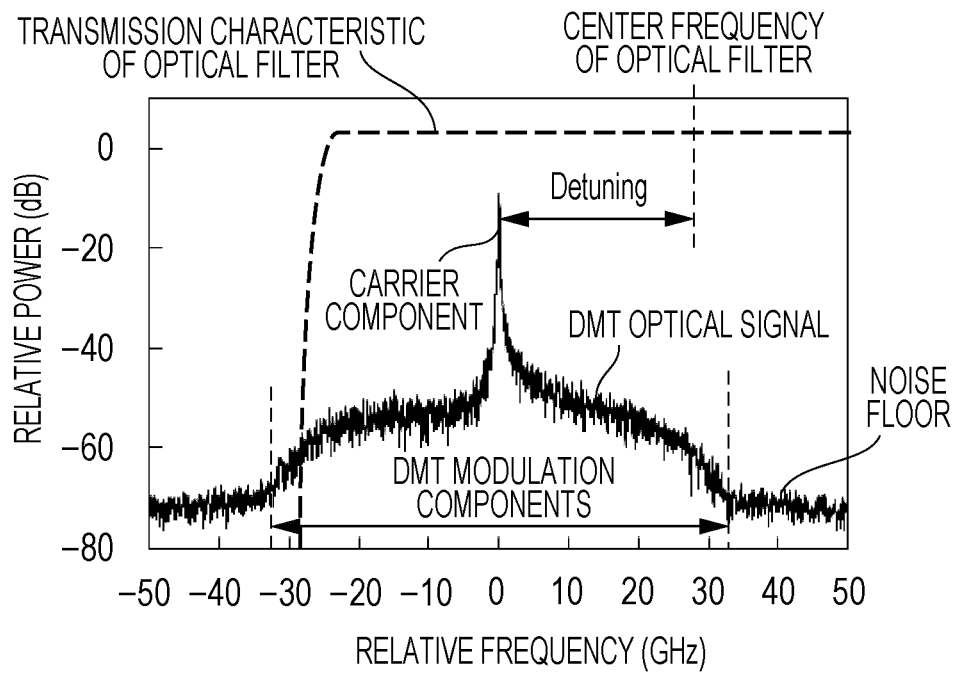
FIG. 9 is a diagram illustrating a transmission characteristic and a control example of an optical filter in the optical transmission system according to the first embodiment.

FIG. 9 is a diagram illustrating a transmission characteristic and a control example of the optical filter 11 in the optical transmission system 1 according to the first embodiment.

FIG. 9 illustrates a graph of the transmission characteristic of the DMT optical signal formed by associating the relative power of the optical signal (dB) monitored by the optical power monitor 12 with the frequency (GHz), for example. The spectrum of the DMT optical signal includes a carrier component, a DMT modulation component, and a noise floor.

The optical power analyzer 13 is an example of a detector, and may analyze the power of the optical signal monitored by the optical power monitor 12. In addition, the optical power analyzer 13 may detect a change in the power monitored by the optical power monitor 12 when the transmission characteristic of the optical filter 11 is changed by the optical filter controller 14 described later. The transmission characteristic may also be referred to as a "filter characteristic". Here, a spectrum analyzer may be employed as the optical power analyzer 13.

The optical power analyzer 13 determines whether or not an amount of change in an optical signal monitored by the optical power monitor 12 is equal to or more than a threshold when the transmission characteristic of the optical filter 11 is changed by the optical filter controller 14 described later, for example. Then, the optical power analyzer 13 detects a change resulting from an intensity ratio between the power of a carrier component and the power of a DMT modulation component.

In the example illustrated in FIG. 9, the optical power analyzer 13 may detect a change in the power such as a decrease in the power within a frequency band from a relative frequency of about 0 GHz at which the carrier component is present, to a relative frequency of about 10 GHz at which the DMT modulation component is present.

Figure 10:
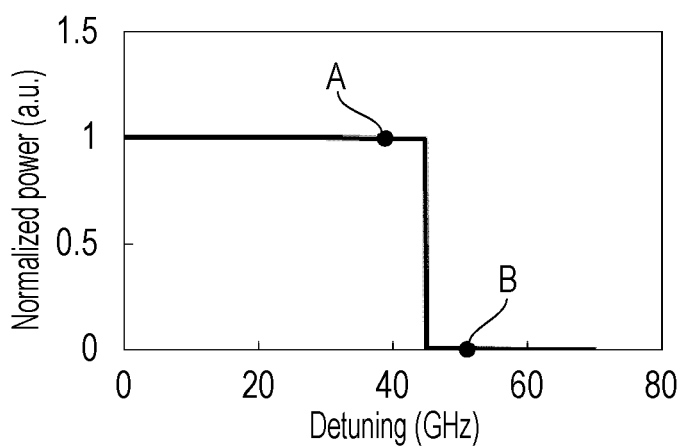
FIG. 10 is a diagram illustrating a change in the power of an optical signal detected by controlling the optical filter depicted in FIG. 9 as an example.

FIG. 10 is a diagram illustrating a detected change in the power of an optical signal by controlling the optical filter 11 illustrated in FIG. 9. In FIG. 10, the change in the power is illustrated for the case where the transmission characteristic of the optical filter 11 is a rectangle of bandwidth 90 GHz.

FIG. 10 illustrates a graph of the transmission characteristic of the DMT optical signal formed by associating the normalized power (Normalized power (a.u.)) of the optical signal monitored by the optical power monitor 12 with the frequency (Detuning (GHz)), for example.

In the example illustrated in FIG. 10, the optical power analyzer 13 compares the power (see point A) obtained when the frequency of the short-wavelength side of the passband of the optical filter 11 is about 40 GHz, with the power (see point B) obtained when the frequency of the short-wavelength side of the passband of the optical filter 11 is about 50 GHz. Then, the optical power analyzer 13 detects a change in the power by detecting a decrease in the power of optical signal when the frequency of the passband of the optical filter 11 in the lower sideband is shifted from about 40 GHz to about 50 GHz. Since the power ratio between the power of the carrier component and the power of the DMT modulation component in the DMT optical signal is very large, the optical power analyzer 13 detects a large power difference when the carrier component is removed by the optical filter 11.

The optical filter controller 14 is an example of a controller, and may perform control to change the transmission characteristic of the optical filter 11. In the first embodiment, the control to change the transmission characteristic is, for example, control to shift the wavelength band at which to allow the optical signal to pass through the optical filter 11 to a long-wavelength side or a short-wavelength side without changing the bandwidth.

When starting to control the optical filter 11, the optical filter controller 14 may control the transmission characteristic or, for example, set the wavelength band at which to allow the optical signal to pass through the optical filter 11 based on the wavelength set by the optical wavelength controller 15 for the optical signal to be transmitted by the optical transmitter 20.

The optical filter controller 14 may control the relative relationship between the transmission characteristic of the optical filter 11 and the frequency (wavelength) of the carrier component such that the carrier component of the optical signal identified based on the change in the power detected by the optical power analyzer 13 will be included in the vestigial sideband.

The vestigial sideband may be a sideband which remains after one of the upper sideband and the lower sideband is entirely removed, or a sideband which remains after one of the upper sideband and the lower sideband is at least partially removed, for example.

In other words, the optical filter controller 14 may detect the carrier component of an optical signal based on a change in the power detected by the optical power analyzer 13. Then, the optical filter controller 14 may control the relative relationship between the transmission characteristic of the optical filter 11 and the frequency (wavelength) of the carrier component such that the identified carrier component will be included and one of the upper sideband and the lower sideband of the optical signal will be at least partially removed by the optical filter 11.

In the present specification, the optical filter controller 14 may control the relative relationship between the transmission characteristic of the optical filter 11 and the frequency (wavelength) of the carrier component by controlling the transmission characteristic of the optical filter 11 without controlling the frequency of the carrier component. Instead, in the present specification, the optical filter controller 14 may control the relative relationship between the transmission characteristic of the optical filter 11 and the frequency (wavelength) of the carrier component by controlling the frequency (wavelength) of the carrier component without controlling the transmission characteristic of the optical filter 11. Alternatively, in the present specification, the optical filter controller 14 may control the relative relationship between the transmission characteristic of the optical filter 11 and the frequency (wavelength) of the carrier component by controlling both the transmission characteristic of the optical filter 11 and the frequency (wavelength) of the carrier component.

In the case of controlling the frequency (wavelength) of the carrier component, the optical filter controller 14 may notify the optical wavelength controller 15 of a control amount (or set value) of the frequency of the carrier component. The optical wavelength controller 15 may set the wavelength (frequency) of the optical signal to be emitted by the light source (not illustrated) of the E/O module 23 included in the optical transmitter 20 based on the control amount (or set value) notified of by the optical filter controller 14.

For example, the optical filter controller 14 may perform control to shift the wavelength band at which to allow the optical signal to pass through the optical filter 11 to the long-wavelength side (or short-wavelength side) until a change in the power of the optical signal is detected by the optical power analyzer 13. Then, when a change in the optical power is detected by the optical power analyzer 13, the optical filter controller 14 may perform control to shift the wavelength band at which to allow the optical signal to pass through the optical filter 11 to the short-wavelength side (or long-wavelength side) or, in other words, in the opposite direction.

In the example illustrated in FIG. 9, when a change in the power of the optical signal is detected by the optical power analyzer 13, the dashed-line frame representing the transmission characteristic of the optical filter 11 (passband) is shifted to the long-wavelength side under the control of the optical filter controller 14.

Figure 11A:
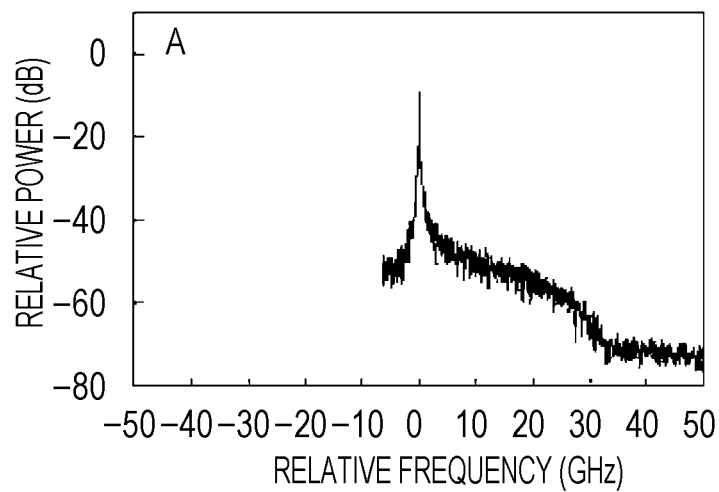
FIG. 11A is a diagram illustrating a vestigial sideband of a spectrum of optical signals passing through the optical filter in a case where point A depicted in FIG. 10 is set as a short-wavelength side edge of a passband of the optical filter.
Figure 11B:
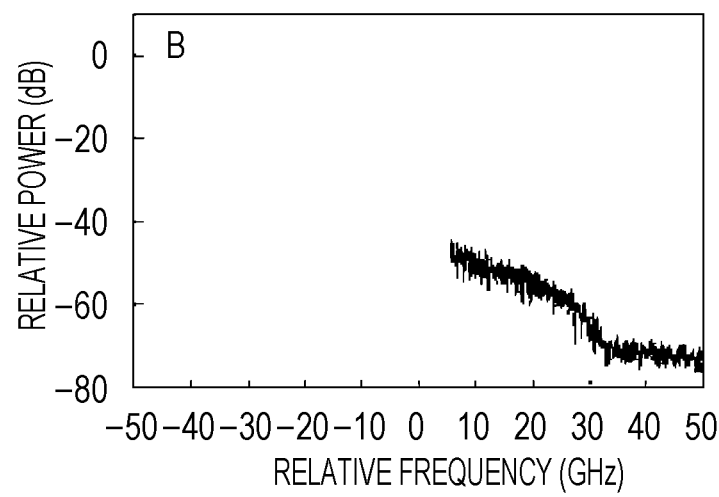
FIG. 11B is a diagram illustrating a vestigial sideband of a spectrum of optical signals passing through the optical filter in a case where point B depicted in FIG. 10 is set as the short-wavelength side edge of the passband of the optical filter.

FIG. 11A is a diagram illustrating the vestigial sideband of the spectrum of the optical signal passing through the optical filter 11 in the case where the point A depicted in FIG. 10 is set as the short-wavelength side edge of the passband of the optical filter 11, and FIG. 11B is a diagram illustrating the vestigial sideband of the spectrum of the optical signal passing through the optical filter 11 in the case where point B depicted in FIG. 10 is set as the short-wavelength side edge of the passband of the optical filter 11.

When the short-wavelength side edge of the passband of the optical filter 11 illustrated in FIG. 9 is shifted to a point at a relative frequency of about −5 GHz, the spectrum of DMT optical signal included in the vestigial sideband is given by the graph illustrated in FIG. 11A, for example. When the short-wavelength side edge of the passband of the optical filter 11 illustrated in FIG. 9 is shifted to a point at a relative frequency of about 5 GHz, the spectrum of DMT optical signal included in the vestigial sideband is given by the graph illustrated in FIG. 11B, for example.

When a change in the power of the optical signal is detected by the optical power analyzer 13, the passband of the optical filter 11 is shifted to the short-wavelength side under the control of the optical filter controller 14. This shift changes the spectrum of the DMT optical signal included in the vestigial sideband from the state of FIG. 11B to the state of FIG. 11A.

The functions of the optical power analyzer 13, the optical filter controller 14, and the optical wavelength controller 15 may be included in, for example, a processor (processing unit: not illustrated) included in the controller 10. In addition, the controller 10 may include a read only memory (ROM: not illustrated) and a random access memory (RAM: not illustrated).

The processor controls an overall operation of the controller 10. A central processing unit (CPU), a micro processing unit (MPU), or a digital signal processor (DSP) may be used as the processor, for example. In addition, the processor to control the overall operation of the controller 10 may be an application-specific integrated circuit (ASIC), a programmable logic device (PLD), or a field programmable gate array (FPGA), for example. Instead, the constituent to control the overall operation of the controller 10 may be a combination of two or more of the CPU, MPU, DSP, ASIC, PLD, AND FPGA.

Operation Example

An example of controlling the optical filter 11 in the optical transmission system 1 according to the first embodiment, which is configured as mentioned above, will be described by following a flowchart (operations S1 to S7) illustrated in FIG. 12.

The optical filter controller 14 sets the center wavelength (center frequency) of the optical filter 11 (operation S1) based on information acquired from the optical wavelength controller 15 and indicating the wavelength (frequency) of the optical signal to be transmitted by the optical transmitter 20.

The optical power monitor 12 monitors the power of the optical signal having passed through the optical filter 11 (operation S2).

The optical power analyzer 13 determines whether or not the initial value of the power of the optical signal is equal to or more than a threshold (operation S3).

If the initial value of the power is less than the threshold (see the No route of operation S3), the processing returns to operation S2.

On the other hand, if the initial value of the power is equal to or more than the threshold (see the Yes route of operation S3), the optical filter controller 14 shifts the center wavelength of the optical filter 11 by a certain fixed bandwidth d (operation S4).

The optical power monitor 12 monitors the power of the optical signal having passed through the optical filter 11 (operation S5).

The optical power analyzer 13 determines whether or not an amount of change in the power of the optical signal is equal to or more than the threshold (operation S6).

If the amount of change in the power is less than the threshold (see the No route of operation S6), the processing returns to operation S4.

On the other hand, if the amount of change in the power is equal to or more than the threshold (see the Yes route of operation S6), the optical filter controller 14 shifts back the center wavelength of the optical filter 11 by the fixed bandwidth d (operation S7), and terminates the processing.

As described above, in the first embodiment, the optical filter controller 14 detects the carrier component of the optical signal based on the change in the power detected by the optical power analyzer 13. Then, the optical filter controller 14 controls the transmission characteristic of the optical filter 11 such that the identified carrier component will be included and one of the upper sideband and the lower sideband of the optical signal will be at least partially removed by the optical filter 11.

As a consequence, it is possible to enhance the accuracy of setting the difference between the center wavelength of the optical filter 11 and the wavelength of the carrier component of the DMT optical signal, and to reduce deterioration of the transmission characteristic in the optical transmission system 1. For example, the transmission characteristic in the case of accumulation of chromatic dispersion may be improved. Making use of the fact that the power of the carrier component is very larger than the power of the DMT modulation component, it is also possible to suppress a control error of the wavelength in the optical transmission system 1 having a wide optical signal band on which a bandwidth limit is imposed by the optical filter 11.

The optical filter controller 14 shifts the wavelength band at which to allow the optical signal to pass through the optical filter 11 to the long-wavelength side, the wavelength band having a fixed bandwidth. In addition, the optical power analyzer 13 detects a change in power resulting from the intensity ratio of the power of the carrier component to the power of the DMT modulation component. The optical filter controller 14, in turn, performs control to shift the wavelength band at which to allow the optical signal to pass through the optical filter 11 to the short-wavelength side when a change in the power is detected by the optical power analyzer 13.

As a consequence, it is possible to reliably detect the carrier component of the optical signal having passed through the optical filter 11.

Modified Example

In the first embodiment described above, the optical filter controller 14 is configured to change the transmission characteristic of the optical filter 11 by shifting the wavelength band at which to allow the optical signal to pass through the optical filter 11 to the long-wavelength side or the short-wavelength side without changing the bandwidth, for example.

In a modified example of the first embodiment, the optical filter controller 14 changes the transmission characteristic of the optical filter 11 by widening or narrowing the bandwidth of the wavelength band at which to allow the optical signal to pass through the optical filter 11, for example.

Figure 13:
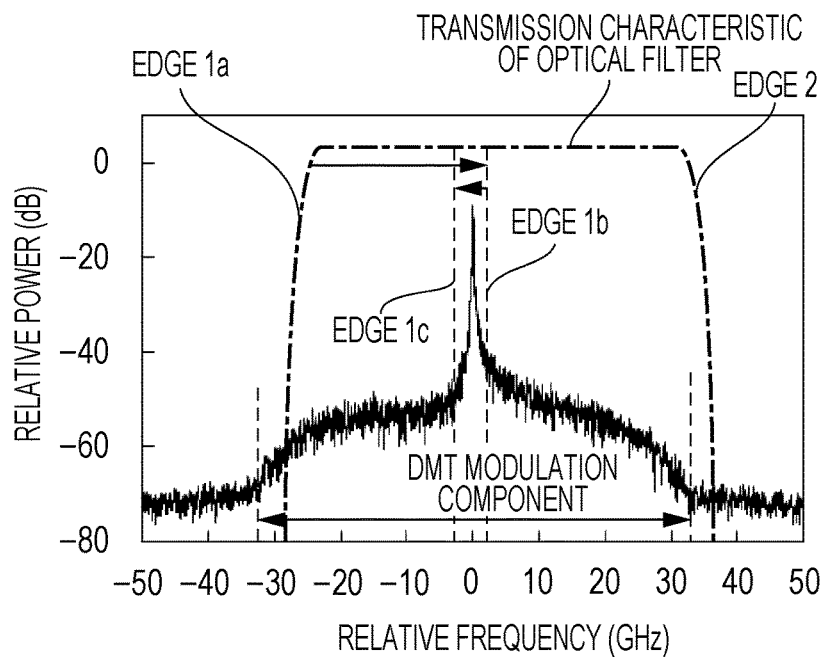
FIG. 13 is a diagram describing a transmission characteristic and a control example of the optical filter in an optical transmission system as a modified example of the first embodiment.

FIG. 13 is a diagram describing the transmission characteristic and a control example of the optical filter 11 in the optical transmission system 1 as the modified example of the first embodiment.

FIG. 13 illustrates an example of the transmission characteristic (passband) of the optical filter 11 of the DMT optical signal. In the illustrated example, the passband of the optical filter 11 is a relative frequency band from an edge is to an edge 2.

In the modified example of the first embodiment, the optical filter controller 14 may control the passband of the optical filter 11 such that both sidebands of the DMT optical signal passed through the optical filter 11 will be included in the passband. For example, the optical filter controller 14 may acquire, from the optical wavelength controller 15, information on the center wavelength of the optical signal to be transmitted by the optical transmitter 20 and determine the center wavelength at which to allow the optical signal to pass through the optical filter 11 based on the acquired information on the center wavelength. Also, the optical filter controller 14 may estimate a desired signal band based on information on the bandwidth of the DMT optical signal and information on sampling rates of the DAC 22 and the ADC 32, and determine the passband at which to allow the optical signal to pass through the optical filter 11. Based on the determined passband, the optical filter controller 14 may control the lower sideband edge and the upper sideband edge of the passband of the optical filter 11.

The optical filter controller 14 may perform control to narrow (or widen) the bandwidth of the wavelength band at which to allow the optical signal to pass through the optical filter 11 until a change in the power of the optical signal is detected by the optical power analyzer 13. Then, when a change in optical power is detected by the optical power analyzer 13, the optical filter controller 14 may perform control to widen (or narrow) the bandwidth of the wavelength band at which to allow the optical signal to pass through the optical filter 11.

In the example illustrated in FIG. 13, the short-wavelength side edge of the passband of the optical filter 11 is shifted from the edge 1a to an edge 1b under the control of the optical filter controller 14 until a change in the power of the optical signal is detected by the optical power analyzer 13. As a consequence, the bandwidth of the passband of the optical filter 11 is narrowed.

When the bandwidth of the passband of the optical filter 11 is narrowed to the relative frequency of the edge 1b illustrated in FIG. 13, the optical power analyzer 13 detects a change in the power. Here, the vestigial sideband of the DMT optical signal is given by the graph illustrated in FIG. 11B.

Based on the detection of the change in the power by the optical power analyzer 13, the short-wavelength side edge of the passband of the optical filter 11 is shifted (in other words, shifted back) from the edge 1b to the edge 1c under the control of the optical filter controller 14. This shift widens the bandwidth of the passband of the optical filter 11. Here, the vestigial sideband of the DMT optical signal is given by the graph illustrated in FIG. 11A. Hence, it is possible to obtain the vestigial sideband including the carrier component as in the first embodiment described above.

In sum, at the time of initial setting or calibration of the optical transmission system 1, the controller 10 may control the lower sideband edge and the upper sideband edge of the passband such that both sidebands of the DMT optical signal may pass through the optical filter 11. Then, the controller 10 may monitor the power of the optical signal having passed through the optical filter 11 and control the lower sideband edge or the upper sideband edge of the passband of the optical filter 11 such that the power of the optical signal having passed through the optical filter 11 will be restored to a state before great attenuation.

As above, in the modified example of the first embodiment, the optical filter controller 14 narrows the bandwidth of the wavelength band at which to allow the optical signal to pass through the optical filter 11. In addition, the optical power analyzer 13 detects a change in the power resulting from the intensity ratio between the power of the carrier component and the power of the DMT demodulation component. The optical filter controller 14, in turn, performs control to widen the bandwidth of the wavelength band at which to allow the optical signal to pass through the optical filter 11 when a change in the power is detected by the optical power analyzer 13.

As a consequence, also in the modified example of the first embodiment, it is possible to bring about effects similar to those in the first embodiment described above and to, for example, reliably detect a carrier component of an optical signal having passed through the optical filter 11.

Second Embodiment

[Example of System Configuration]

In an example of a second embodiment, an optical filter controller 14 changes the transmission characteristic of an optical filter 11 by setting optical signal transmittance such that a part of the frequency band at which to allow the optical signal to pass through the optical filter 11 has lower transmittance than the other frequency band, for example. The transmission characteristic of the optical filter 11 may be changed, for example, at the time of initial setting or calibration of an optical transmission system 1.

Figure 14:
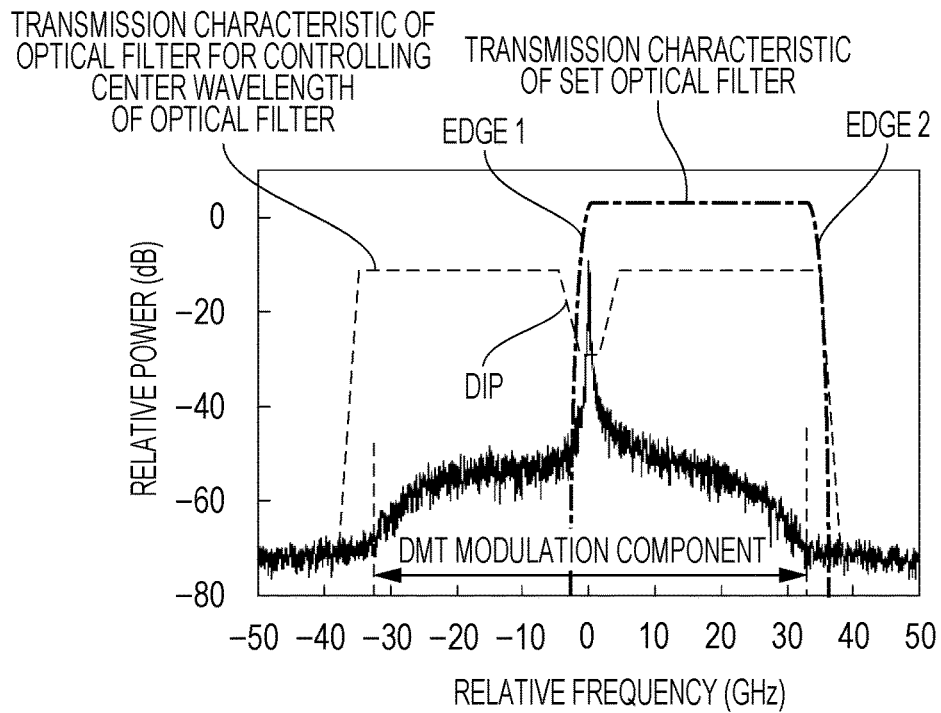
FIG. 14 is a diagram describing a transmission characteristic and a control example of the optical filter in an optical transmission system according to a second embodiment.
Figure 15:
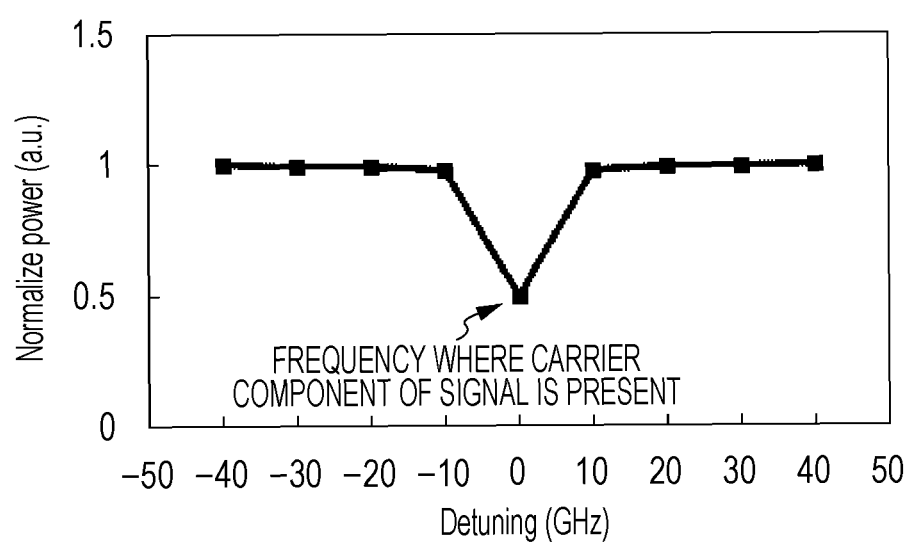
FIG. 15 is a diagram illustrating a detected change in the power of an optical signal by controlling the optical filter depicted in FIG. 14 as an example.

FIG. 14 is a diagram describing the transmission characteristic and a control example of the optical filter 11 in the optical transmission system 1 according to the second embodiment, and FIG. 15 is a diagram illustrating a detected change in the power of optical signal by controlling the optical filter 11 depicted in FIG. 14 as an example.

As illustrated in FIG. 14, the optical filter controller 14 may set, as the transmission characteristic of the optical filter 11 for controlling the center frequency of the optical filter 11, a transmission characteristic where a dip is formed near the frequency at which a carrier component is set. The dip has relatively low optical signal transmittance within the passband of the optical filter 11.

When starting to control the optical filter 11, the optical filter controller 14 may control the transmission characteristic by setting the wavelength band where the dip is formed based on the wavelength set by the optical wavelength controller 15 for the optical signal to be transmitted by an optical transmitter 20.

An optical power analyzer 13 may detect a wavelength band (or a frequency band) where the power of the optical signal having passed through the optical filter 11 is relatively low.

In FIG. 15, the normalized power of the optical signal (Normalized Power (a.u.)) and the frequency (Detuning (GHz)) are associated with one another. The optical power analyzer 13 may detect a frequency at which the normalized power of optical signal is relatively low.

The optical filter controller 14 may perform control to change the transmission characteristic of the optical filter 11 where the dip is formed until the optical power analyzer 13 detects a wavelength band (or a frequency band) where the power of the optical signal is relatively low. For example, the optical filter controller 14 may shift the passband of the optical filter 11 where the dip is formed (dip-formation passband) to the long-wavelength side until the optical power analyzer 13 detects a wavelength band where the power of the optical signal is relatively low.

The optical filter controller 14 may control the transmission characteristic of the optical filter 11 by keeping the dip-formation passband of the optical filter 11 fixed and changing a dip-formation frequency band within the fixed passband. Instead, the optical filter controller 14 may control the transmission characteristic of the optical filter 11 by shifting the dip-formation passband of the optical filter 11 while retaining the position of the dip relative to the dip-formation passband of the optical filter 11.

In the example illustrated in FIG. 14, since no dip is formed within the frequency band of relative frequency from about −40 GHz to about −10 GHz, the power of the optical signal detected is almost fixed at about 1, as illustrated in FIG. 15.

When the optical power analyzer 13 detects a wavelength band (or a frequency band) where the power of the optical signal is relatively low, the optical filter controller 14 may control the transmission characteristic of the optical filter 11 such that the detected wavelength band (or the frequency band) will be included in the vestigial sideband. The optical filter controller 14 may estimate the desired signal band based on the information on the bandwidth of the DMT optical signal and the information on the sampling rates of a DAC 22 and an ADC 32, and control the difference between the lower sideband edge and the upper sideband edge of the passband of the optical filter 11, for example.

In a frequency band of relative frequency from about −10 GHz to about 10 GHz, the dip is formed as in FIG. 14, and thus the power of the optical signal detected decreases from about 1 to about 0.5, as illustrated in FIG. 15. When the optical power analyzer 13 detects a change in the power of the optical signal, the optical filter controller 14 may perform control such that the passband of the optical filter 11 is set to the frequency band from the edge 1 to the edge 2, which includes the carrier component, as illustrated in FIG. 14. Then, a vestigial sideband of a DMT optical signal is obtained as in the graph illustrated in FIG. 11A. Hence, it is possible to obtain the vestigial sideband including the carrier component as in the first embodiment described above.

As described above, in the second embodiment, the optical filter controller 14 sets the passband of the optical filter 11 such that the passband will include a band where the transmittance is partly relatively low within the wavelength band of an optical signal. In addition, the optical power analyzer 13 detects a wavelength band where the power of the optical signal is relatively low. Then, when the optical power analyzer 13 detects the wavelength band where the power of the optical signal is relatively low, the optical filter controller 14 controls the transmission characteristic of the optical filter 11 such that the detected wavelength band will be included in the vestigial sideband.

As a consequence, also in the second embodiment, it is possible to bring about effects similar to those in the first embodiment described above and to, for example, enhance the accuracy of detecting a carrier component because the sensitivity of detecting the power of an optical signal is enhanced.

Third Embodiment

[Example of System Configuration]

In a third embodiment, an optical filter controller 14 controls the transmission characteristic of an optical filter 11 for at least one or some of multiple optical signals with different wavelengths multiplexed in a wavelength-multiplexed optical signal, for example. The control of the transmission characteristic of the optical filter 11 may be performed at the time of initial setting or calibration of an optical transmission system 1a, for example.

Figure 16:
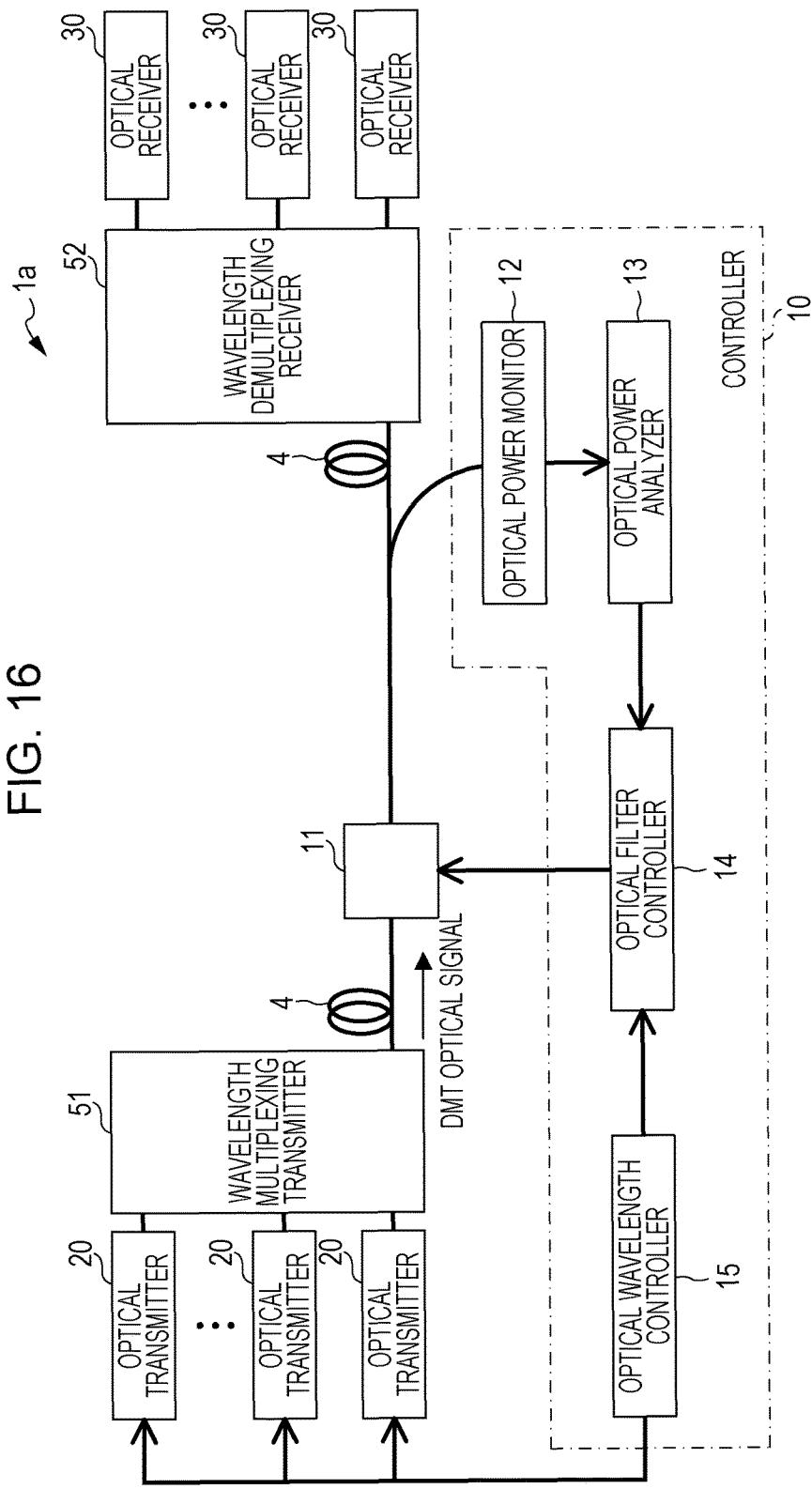
FIG. 16 is a block diagram illustrating an example of a functional configuration of an optical transmission system according to a third embodiment.

FIG. 16 a block diagram illustrating an example of a functional configuration of the optical transmission system is according to the third embodiment.

The optical transmission system 1a illustrated in FIG. 16 may include optical transmitters 20, a wavelength multiplexing transmitter 51, the optical filter 11, a wavelength demultiplexing receiver 52, the controller 10, and optical receivers 30, for example.

The optical transmitters 20 may transmit optical signals having different wavelengths, respectively.

The wavelength multiplexing transmitter 51 may multiplex multiple inputted optical signals with different wavelengths and output a multiplexed optical signal. For example, the wavelength multiplexing transmitter 51 may multiplex multiple optical signals with different wavelengths inputted from the respective optical transmitters 20, generate a wavelength-multiplexed optical signals, and transmit the generated wavelength-multiplexed optical signal to the optical receivers 30 via the optical filter 11 and the wavelength demultiplexing receiver 52.

The optical filter 11 may receive the wavelength-multiplexed optical signal generated by the wavelength multiplexing transmitter 51 as an input.

The wavelength demultiplexing receiver 52 may output multiple optical signals with different wavelengths by demultiplexing the inputted wavelength-multiplexed optical signal. For example, the wavelength demultiplexing receiver 52 may receive the wavelength-multiplexed optical signal transmitted from the wavelength multiplexing transmitter 51 via the optical filter 11. Then, the wavelength demultiplexing receiver 52 may demultiplex the received wavelength-multiplexed optical signal by wavelength, and input the demultiplexed optical signals with different wavelengths to the respective optical receivers 30.

Each of the optical receivers 30 may receive an optical signal outputted by the wavelength demultiplexing receiver 52.

An optical power monitor 12 may monitor the power of the wavelength-multiplexed optical signal having passed through the optical filter 11.

Figure 17:
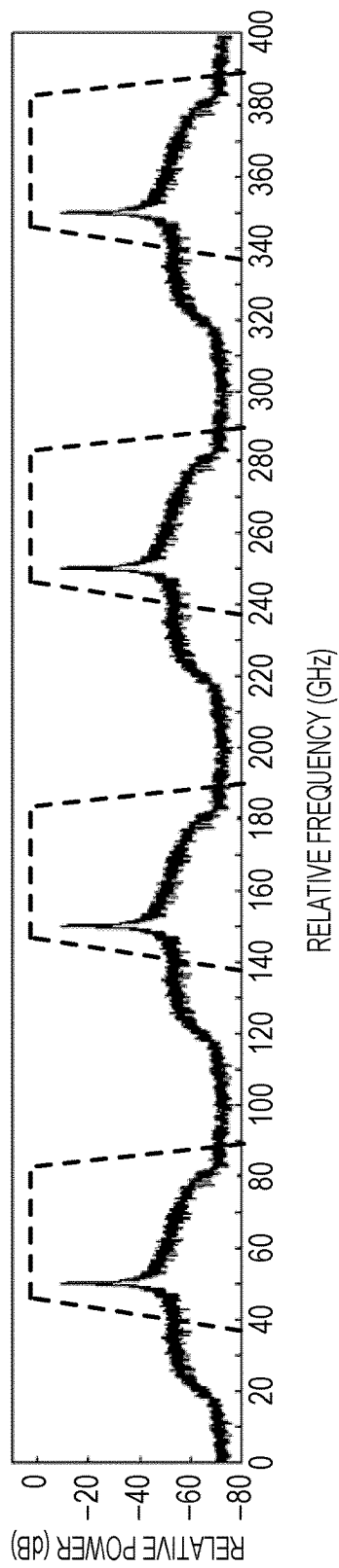
FIG. 17 is a diagram illustrating an example of a spectrum of a wavelength-multiplexed optical signal transmitted in the optical transmission system according to the third embodiment.

FIG. 17 is a diagram illustrating an example of the spectrum of a wavelength-multiplexed optical signal transmitted in the optical transmission system is according to the third embodiment.

As illustrated in FIG. 17, the power of the wavelength-multiplexed optical signal is represented in a way that the graphs of the transmission characteristic of the DMT optical signal in FIG. 9 are used as many as the optical transmitters 20 and are arranged in an axial direction of the relative frequency. FIG. 17 indicates that the number of wavelengths of the optical signal transmitted in the optical transmission system 1a is 4.

The optical filter controller 14 may select one of the carrier components (for example, the carrier component with the shortest wavelength) included in the wavelength-multiplexed optical signal monitored by the optical power monitor 12. Then, the optical filter controller 14 may control the transmission characteristic of the optical filter 11 for the selected carrier component by changing the transmission characteristic of the optical filter 11.

In the example illustrated in FIG. 17, the optical filter controller 14 selects the carrier component with a relative frequency of about 50 GHz, for example. Then, the optical filter controller 14 may control the transmission characteristic of the optical filter 11 for the selected carrier component with the relative frequency of about 50 GHz by changing the transmission characteristic of the optical filter 11.

An optical power analyzer 13 may analyze the power of the wavelength-multiplexed optical signal monitored by the optical power monitor 12. The optical power analyzer 13 may detect a change in the power which is monitored by the optical power monitor 12 when the transmission characteristic of the optical filter 11 is changed by the optical filter controller 14, for example.

The optical filter controller 14 may control the transmission characteristic of the optical filter 11 such that the carrier component of the optical signal identified based on the change in the power detected by the optical power analyzer 13 will be included in the vestigial sideband. Since the power ratio between the power of the carrier component and the power of the DMT modulation component is large, the optical filter controller 14 may perform the above control for one of multiple DMT optical signals with different wavelengths.

When the control of the transmission characteristic of the optical filter 11 for one carrier component is completed, the optical filter controller 14 may select a carrier component for which the control is not completed. Then, the optical filter controller 14 may control the transmission characteristic of the optical filter 11 for the selected carrier component for which the control is not completed in the same manner as the control for the carrier component for which the control is completed.

In the example illustrated in FIG. 17, when the control of the relative relationship for the carrier component with a relative frequency of about 50 GHz is completed, the optical filter controller 14 may select the carrier component which has a relative frequency of about 150 GHz, and for which the control is not completed, for example. Then, the optical filter controller 14 may control the transmission characteristic of the optical filter 11 for the selected carrier component with the relative frequency of about 150 GHz in the same manner as the control for the carrier component with the relative frequency of about 50 GHz. The optical filter controller 14 may set the passbands of the optical filter 11 for the carrier components as dashed-line frames illustrated in FIG. 17.

Instead, when the control of the transmission characteristic of the optical filter 11 for one carrier component is completed, the optical filter controller 14 may control at once the transmission characteristics of the optical filter 11 for carrier components for which the control is not completed. In this case, the optical filter controller 14 may calculate frequency intervals between the carrier components based on information acquired from an optical wavelength controller 15 and indicating the center frequencies of the carrier components to be transmitted by the optical transmitters 20. Then, the optical filter controller 14 may control the transmission characteristics of the optical filter 11 for carrier components for which the control is not completed based on the calculated frequency intervals and an adjustment amount of the transmission characteristics of the optical filter 11 at the carrier component for which the control is completed.

In the example illustrated in FIG. 17, the optical filter controller 14 may acquire, from the optical wavelength controller 15, information indicating that the center frequencies of the carrier components to be transmitted by the optical transmitters 20 are 50 GHz, 150 GHz, 250 GHz, and 350 GHz. The optical filter controller 14 may obtain 100 GHz by calculating the frequency intervals between the carrier components based on the acquired information. Then, the optical filter controller 14 controls the transmission characteristics of the optical filter 11 for the carrier components with relative frequencies of 150 GHz, 250 GHz, and 350 GHz based on the calculated frequency interval of 100 GHz and an adjustment amount of the transmission characteristic of the optical filter 11 for the carrier component with a relative frequency of 50 GHz, for which the control is completed.

Operation Example

An example of controlling the optical filter 11 in the optical transmission system 1a according to the third embodiment, which is configured as mentioned above, will be described by following a flowchart (operations S11 to S24) illustrated in FIGS. 18 and 19. Here, the processing of operations S11 to S18 is illustrated in FIG. 18, and the processing of operations S19 to S24 is illustrated in FIG. 19.

The optical filter controller 14 sets the center wavelengths (center frequencies) of the optical filter 11 (operation S11 of FIG. 18) based on information acquired from the optical wavelength controller 15 and indicating the wavelengths (frequencies) of optical signals to be transmitted by the optical transmitters 20.

Figure 18:
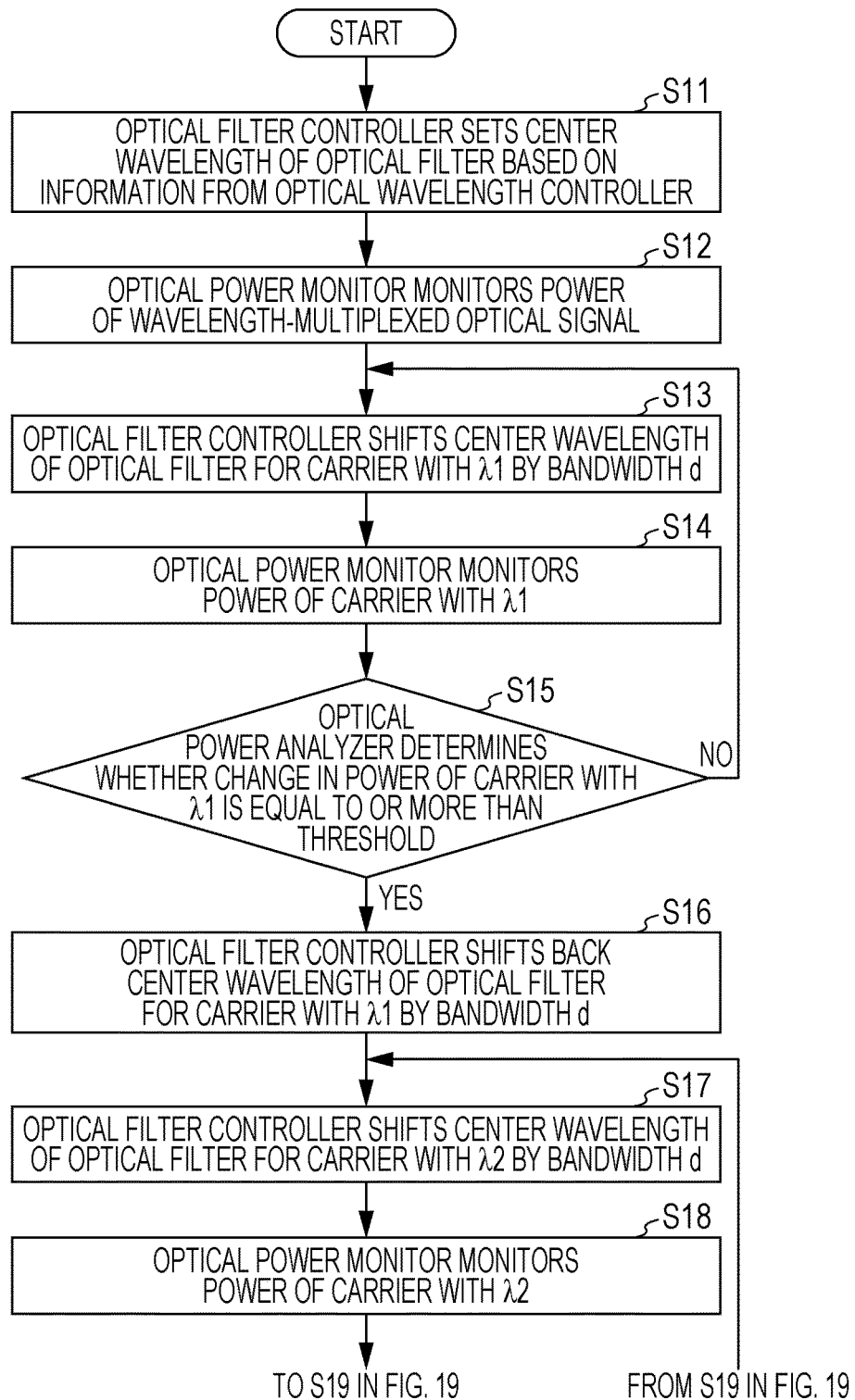
FIG. 18 is a flowchart describing an example of controlling the optical filter in the optical transmission system according to the third embodiment.
Figure 19:
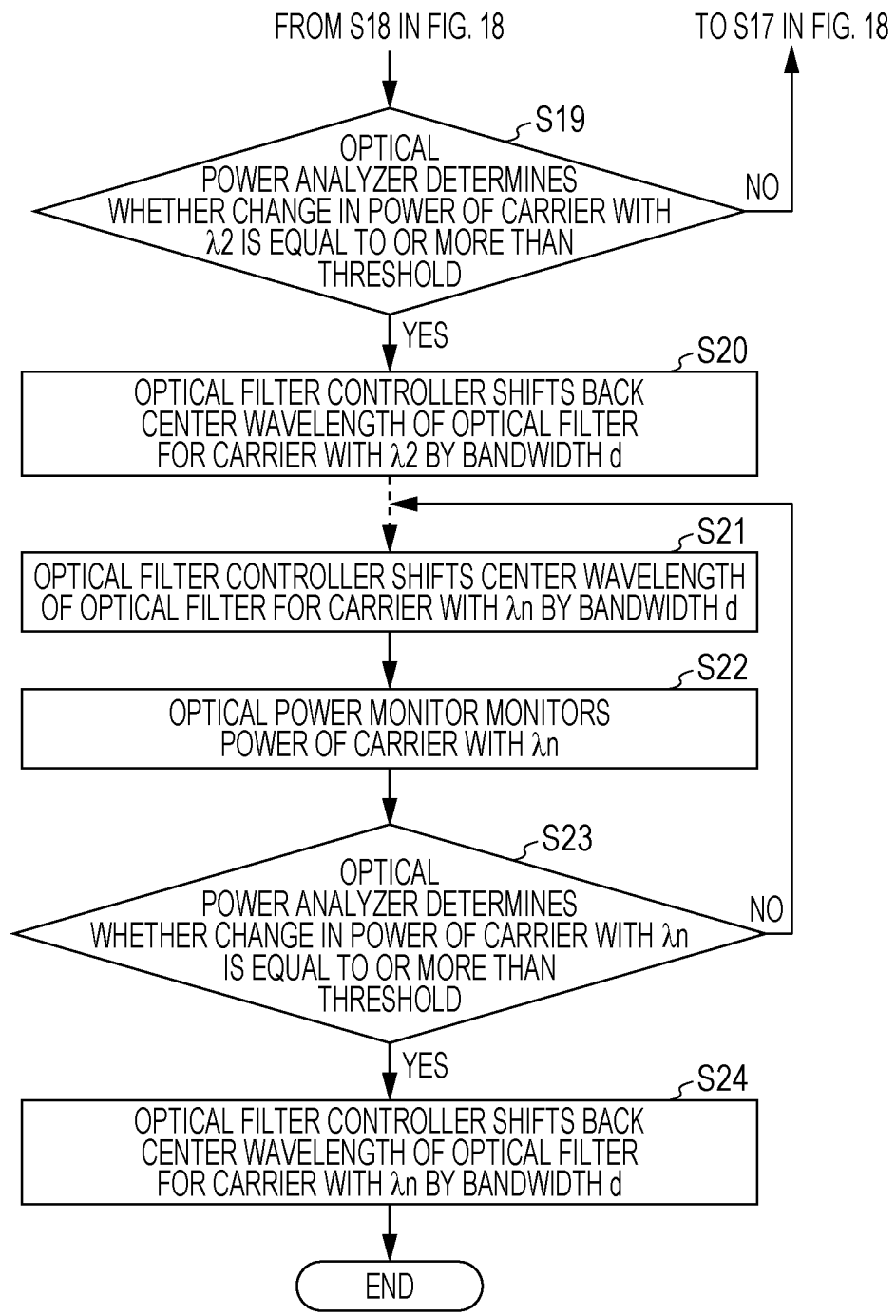
FIG. 19 is the flowchart describing the example of controlling the optical filter in the optical transmission system according to the third embodiment.

The optical power monitor 12 monitors the power of the wavelength-multiplexed optical signal having passed through the optical filter 11 (operation S12 of FIG. 18).

The optical filter controller 14 shifts the center wavelength of the optical filter 11 for the carrier component with a wavelength λ1 by a certain fixed bandwidth d (operation S13 of FIG. 18).

The optical power monitor 12 monitors the power of the carrier component with the wavelength λ1 (operation S14 of FIG. 18).

The optical power analyzer 13 determines whether or not an amount of change in the power of the carrier component with the fixed bandwidth λ1 is equal to or more than the threshold (operation S15 of FIG. 18).

If the amount of change in the power is less than the threshold (see the No route of operation S15 of FIG. 18), the processing returns to operation S13 of FIG. 18.

On the other hand, if the amount of change in the power is equal to or more than the threshold (see the Yes route of operation S15 of FIG. 18), the optical filter controller 14 shifts back the center wavelength of the optical filter 11 for the carrier component with the wavelength λ1 by the fixed bandwidth d (operation S16 of FIG. 18).

The optical filter controller 14 shifts the center wavelength of the optical filter 11 for the carrier component with a wavelength λ2 by the fixed bandwidth d (operation S17 of FIG. 18).

The optical power monitor 12 monitors the power of the carrier component with the wavelength λ2 (operation S18 of FIG. 18).

The optical power analyzer 13 determines whether or not an amount of change in the power of the carrier component with the wavelength λ2 is equal to or more than the threshold (operation S19 of FIG. 19).

If the amount of change in the power is less than the threshold (see the No route of operation S19 of FIG. 19), the processing returns to operation S17 of FIG. 18.

On the other hand, if the amount of change in the power is equal to or more than the threshold (see the Yes route of operation S19 of FIG. 19), the optical filter controller 14 shifts back the center wavelength of the optical filter 11 for the carrier component with the wavelength λ2 by the fixed bandwidth d (operation S20 of FIG. 19).

Thereafter, the controller 10 controls the center wavelengths of the optical filter 11 for the carrier components with wavelengths λ3 to λn−1 in a similar manner.

Then, the optical filter controller 14 shifts the center wavelength of the optical filter 11 for the carrier component with a wavelength λn by the fixed bandwidth d (operation S21 of FIG. 19).

The optical power monitor 12 monitors the power of the carrier component with the wavelength λn (operation S22 of FIG. 19).

The optical power analyzer 13 determines whether or not an amount of change in the power of the carrier component with the wavelength λn is equal to or more than the threshold (operation S23 of FIG. 19).

If the amount of change in the power is less than the threshold (see the No route of operation S23 of FIG. 19), the processing returns to operation S21 of FIG. 19.

On the other hand, if the amount of change in the power is equal to or more than the threshold (see the Yes route of operation S23 of FIG. 19), the optical filter controller 14 shifts back the center wavelength of the optical filter 11 for the carrier component with the wavelength λn by the fixed bandwidth d (operation S24 of FIG. 19), and terminates the processing.

As described above, in the third embodiment, the optical filter controller 14 controls the transmission characteristic(s) of the optical filter 11 for at least one or some of multiple optical signals of different wavelengths multiplexed in a wavelength-multiplexed optical signal.

As a consequence, also in the third embodiment, it is possible to bring about effects similar to those in the first embodiment described above. In addition, the following effect may be obtained.

In the optical transmission system is where a wavelength-multiplexed optical signal is transmitted, the processing of controlling the optical filter 11 for multiple optical signals with different wavelengths may be performed by using only one controller 10. Hence, the cost of installing the optical transmission system is may be reduced.

In the case of conventional non-return-to-zero (NRZ) signals, it is not possible to monitor at once an entire wavelength-multiplexed optical signal and to control the passband of the optical filter. In the third embodiment, on the other hand, the passbands of the optical filter may be controlled by transmitting DMT optical signals and monitoring the wavelength-multiplexed optical signal with one optical power monitor 12.

Fourth Embodiment

[Example of System Configuration]

In a fourth embodiment, an optical filter 11 may have a fifth order Gaussian transmission characteristic of 45 GHz with a 3-dB band, for example.

Figure 20:
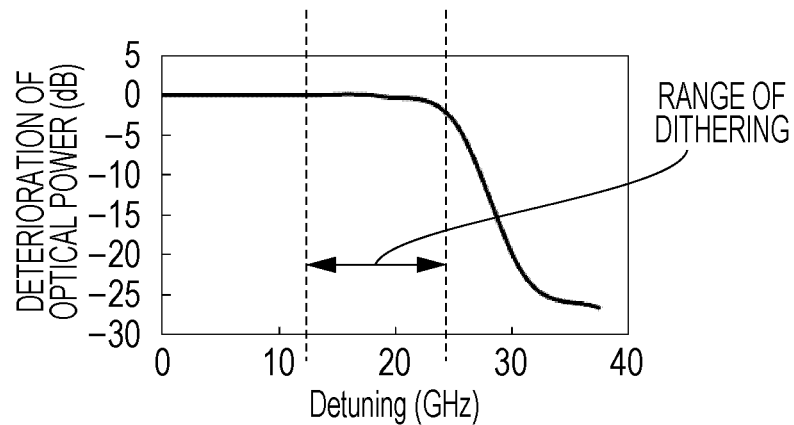
FIG. 20 is a diagram describing an example of controlling the optical filter in an optical transmission system according to a fourth embodiment.
Figure 21:
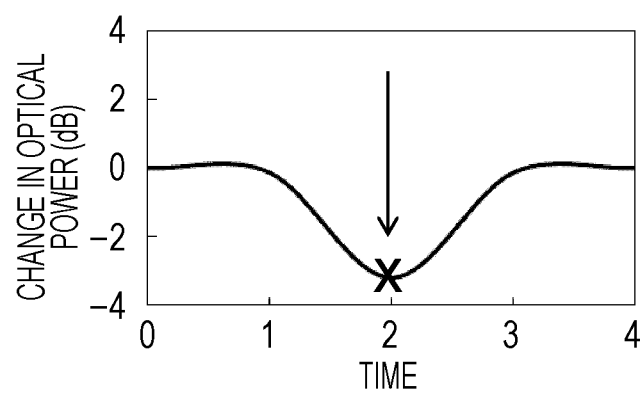
FIG. 21 is a diagram illustrating a detected change in the power of an optical signal by controlling the optical filter depicted in FIG. 20 as an example.

FIG. 20 is a diagram describing an example of controlling the optical filter 11 in an optical transmission system 1 according to the fourth embodiment, and FIG. 21 is a diagram illustrating a detected change in the power of an optical signal by controlling the optical filter 11 depicted in FIG. 20 as an example.

In the fourth embodiment, FIG. 20 illustrates a graph of the transmission characteristic of a DMT optical signal formed by associating deterioration amount in the power of the optical signal (dB) transmitted through the optical filter 11 with the frequency (Detuning) (GHz), for example.

The optical filter controller 14 may control the passband of the optical filter 11 until a change in the power of the optical signal is detected by the optical power analyzer 13. The optical filter controller 14 may control the passband of the optical filter 11 within a penalty-free range in an optical signal passing through the optical filter 11 (for example, "Range of Dithering" illustrated in FIG. 20) (in other words, within a range where the power of the optical signal is equal to or more than a threshold). In other words, the optical filter controller 14 may determine the maximum bandwidth of the passband of the optical filter 11 within a penalty-free range.

In the example illustrated in FIG. 20, the optical filter controller 14 may recognize that the penalty-free range in an optical signal passing through the optical filter 11 is a range where the deterioration amount of the power of the optical signal is equal to or more than about −2 dB (see the chain dashed line in FIG. 20). The optical filter controller 14 may perform control to set the frequency range of about 12 GHz to 23 GHz as the passband of the optical filter 11 (in other words, the range of dithering) based on the recognized penalty-free range.

The optical filter controller 14 may control dithering (in other words, widening or narrowing) of the passband of the optical filter 11 while the center wavelength at which to allow the optical signal to pass through the optical filter 11 is fixed, within the maximum bandwidth of the passband of the controlled optical filter 11. The optical filter controller 14 may perform dithering by widening the bandwidth of the passband of the optical filter 11 from 0 toward the maximum bandwidth until a change in the power is detected by the optical power analyzer 13, for example. The optical filter controller 14 may determine an amount of widening or narrowing of the bandwidth of the passband of the optical filter based on the amount of change at the time of design or initial setting.

FIG. 21 illustrates a graph indicating a time-series amount of change in the power of the optical signal (dB) monitored by the optical power monitor 12 in the case where the optical filter controller 14 performs dithering.

In the example illustrated in FIG. 21, the optical filter controller 14 may recognize the passband of the optical filter 11 at time 2 when the optical power analyzer 13 detects that an amount of change in the power of the optical signal is minimum (see X of FIG. 21). Then, the optical filter controller 14 may perform control such that the optical filter 11 will allow the optical signal to pass within the passband recognized at time 2. Here, the vestigial sideband of the DMT optical signal is given by the graph illustrated in FIG.

11A. Hence, it is possible to obtain a vestigial sideband including a carrier component as in the first embodiment described above.

Operation Example

An example of controlling the optical filter 11 in the optical transmission system 1 according to the fourth embodiment, which is configured as mentioned above, will be described by following a flowchart (operations S31 to S39) illustrated in FIGS. 22 to 23. Here, the processing of operations S31 to S37 is illustrated in FIG. 22, and the processing of operations S38 and S39 is illustrated in FIG. 23.

The optical filter controller 14 sets the center wavelength (center frequency) of the optical filter 11 (operation S31 of FIG. 22) based on information acquired from the optical wavelength controller 15 and indicating the wavelength (frequency) of the optical signal to be transmitted by the optical transmitter 20.

Figure 22:
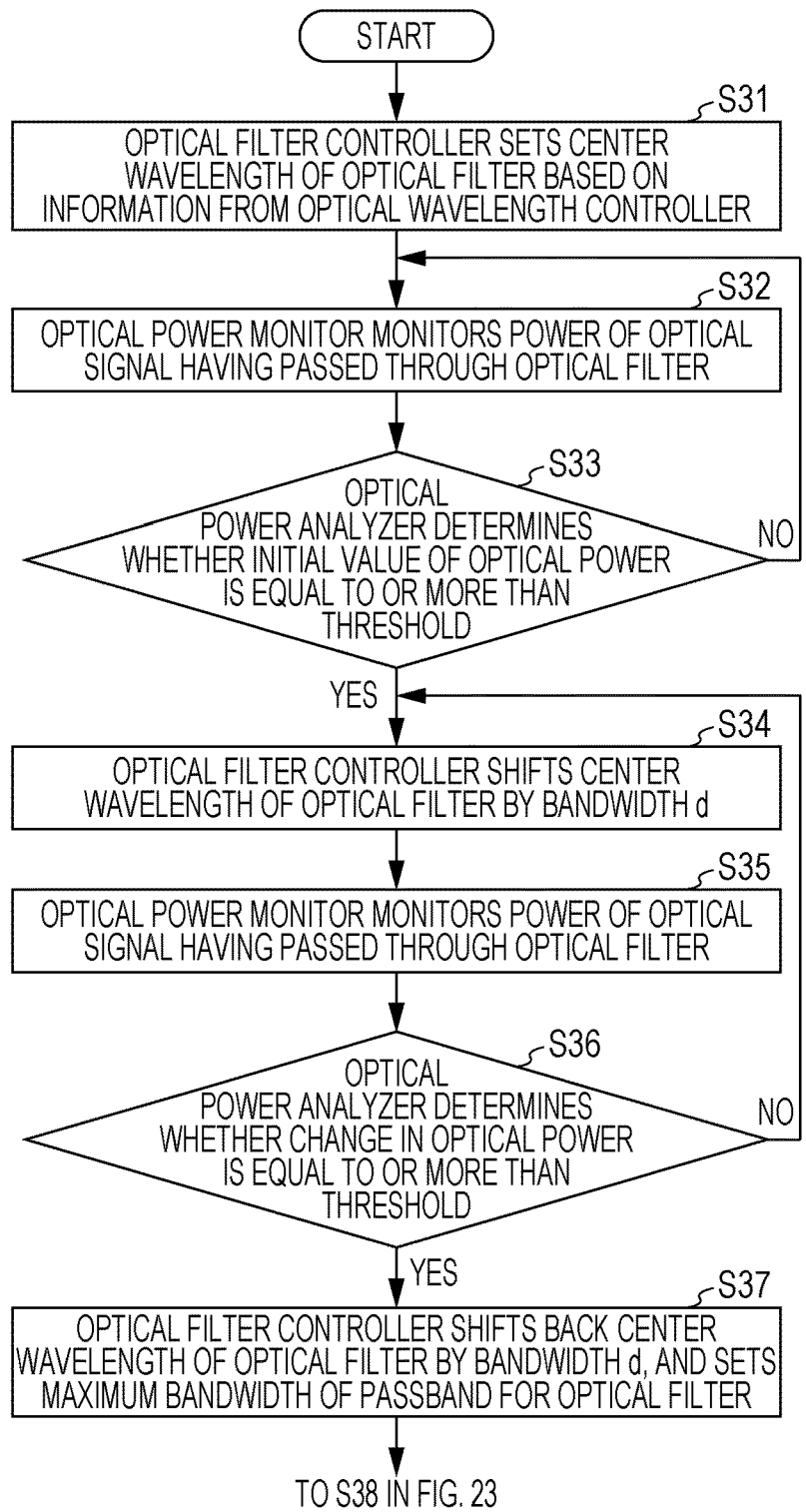
FIG. 22 is a flowchart describing an example of controlling the optical filter in the optical transmission system according to the fourth embodiment.
Figure 23:
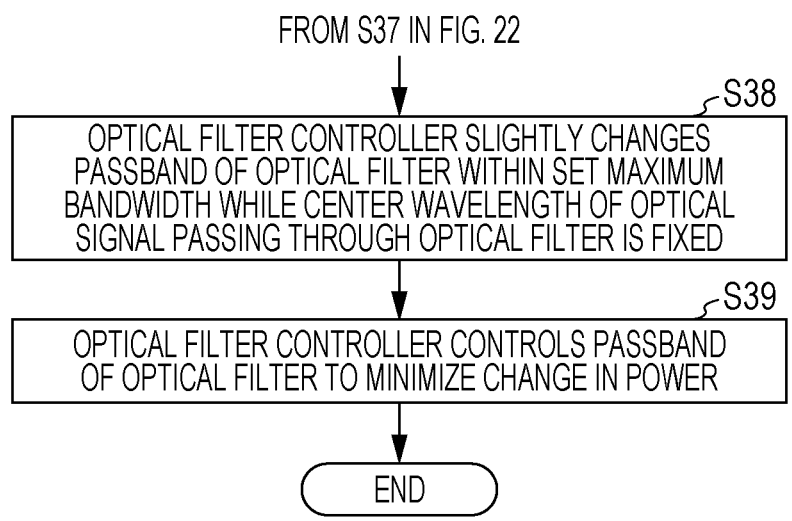
FIG. 23 is a flowchart describing the example of controlling the optical filter in the optical transmission system according to the fourth embodiment.

The optical power monitor 12 monitors the power of the optical signal having passed through the optical filter 11 (operation S32 of FIG. 22).

The optical power analyzer 13 determines whether or not the initial value of the power is equal to or more than a threshold (operation S33 of FIG. 22).

If the initial value of the power is less than the threshold (see the No route of operation S33 of FIG. 22), the processing returns to operation S32 of FIG. 22.

On the other hand, if the initial value of the power is equal to or more than the threshold (see the Yes route of operation S33 of FIG. 22), the optical filter controller 14 shifts the center wavelength of the optical filter 11 by a certain fixed bandwidth d (operation S34 of FIG. 22).

The optical power monitor 12 monitors the power of the optical signal having passed through the optical filter 11 (operation S35 of FIG. 22).

The optical power analyzer 13 determines whether or not an amount of change in the power is equal to or more than the threshold (operation S36 of FIG. 22).

If the amount of change in the power is less than the threshold (see the No route of operation S36 of FIG. 22), the processing returns to operation S34 of FIG. 22.

On the other hand, if the amount of change in the power is equal to or more than the threshold (see the Yes route of operation S36 of FIG. 22), the optical filter controller 14 shifts back the center wavelength of the optical filter 11 by the fixed bandwidth d, and sets the maximum bandwidth of the passband of the optical filter 11 (operation S37 of FIG. 22).

The optical filter controller 14 slightly changes the passband of the optical filter 11 within the set maximum bandwidth while the center wavelength at which to allow the optical signal to pass through the optical filter 11 is fixed (operation S38 of FIG. 23).

The optical filter controller 14 controls the passband of the optical filter 11 to minimize the amount of change in the power (operation S39 of FIG. 23), and terminates the processing.

As described above, in the example of the fourth embodiment, the optical filter controller 14 changes the width of the passband of the optical filter 11 within a range where the deterioration amount of the power of the optical signal passing through the optical filter 11 is equal to or less than the threshold. In addition, the optical power analyzer 13 detects a change in the power of the optical signal by detecting the extremal of the deterioration amount of the power of the optical signal. The optical filter controller 14, in turn, sets the passband of the optical filter 11 to the passband at the time when the change in the power of the optical signal is detected.

As a consequence, also in the example of the fourth embodiment, it is possible to bring about effects similar to those in the example of the first embodiment described above. In addition, the following effect may be obtained.

It is possible to perform the processing of controlling the optical filter 11 without affecting optical signals being transmitted during the transmission of the optical signals in the optical transmission system 1.

Fifth Embodiment

[Example of System Configuration]

In an example of a fifth embodiment, an optical filter controller 14 may control the transmission characteristic of an optical filter 11 by attenuating the power of the optical signal passing through the optical filter 11.

Figure 24:
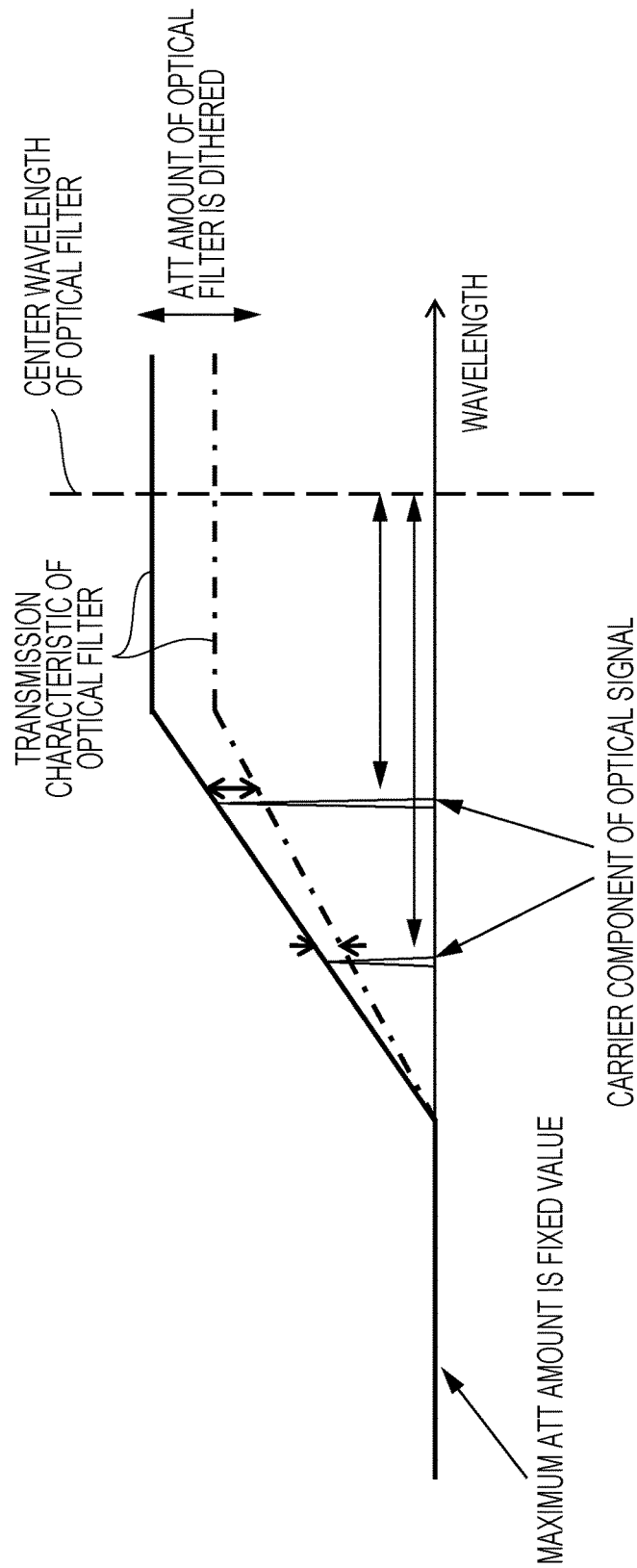
FIG. 24 is a diagram describing an example of controlling the optical filter in an optical transmission system according to a fifth embodiment.

FIG. 24 is a diagram describing an example of controlling the optical filter 11 in an optical transmission system 1 according to the fifth embodiment. FIG. 24 schematically illustrates the transmission characteristic of the optical filter 11 and the carrier component of the optical signal having passed through the optical filter 11. FIG. 24 illustrates two carrier components as an example for the purpose of explanation.

In the example illustrated in FIG. 24, the optical filter controller 14 dithers the transmission characteristic of the optical filter 11 by decreasing the attenuation amount (ATT amount) of the transmission characteristic of the optical filter 11 from the maximum ATT amount of a fixed value. The optical filter controller 14 may decrease the ATT amount to an extent which does not affect the optical signal transmitting through the optical transmission system 1.

When the ATT amount is decreased, the gradient of the transmission characteristic of the optical filter 11 changes as illustrated in FIG. 24. As a consequence, the powers of two carrier components illustrated in FIG. 24 and monitored by an optical power monitor 12 also attenuate. An optical power analyzer 13 may detect a change in the power of a carrier component resulting from the attenuation of the power of the optical signal having passed through the optical filter 11.

As illustrated in FIG. 24, the attenuation amount of power at a carrier component depends on the distance from the wavelength of the carrier component to the center wavelength of the optical filter 11. When a change in the power of a carrier component is detected by the optical power analyzer 13, the optical filter controller 14 may control the transmission characteristic of the optical filter 11 based on the attenuation amount of the power of the carrier component and the distance from the wavelength of the carrier component to the center wavelength of the optical filter 11. Here, the vestigial sideband of the DMT optical signal is given by the graph illustrated in FIG. 11A. Hence, it is possible to obtain a vestigial sideband including a carrier component as in the first embodiment described above.

As illustrated in FIG. 24, there is a range near the center wavelength of the optical filter 11 where the gradient of the transmission characteristic of the optical filter 11 does not change even if the ATT amount is dithered. When a carrier component of the optical signal is present within the range where the gradient of the transmission characteristic of the optical filter 11 does not change, the optical power analyzer 13 may fail to detect the attenuation of the power of the optical signal even if the ATT amount is dithered. To address this, the optical filter controller 14 may dither the ATT amount after the optical filter controller 14 controls the transmission characteristic of the optical filter 11 such that the difference between the frequency of the carrier component of the optical signal and the center frequency of the optical filter 11 is equal to or more than a predetermined value. With this control, the carrier component of the optical signal is included in the range where the gradient of transmission characteristic of the optical filter 11 changes due to dithering of the ATT amount. Thus, the optical power analyzer 13 is enabled to detect the attenuation of the power of the optical signal.

Information indicating the relationship between the attenuation amount of the power of a carrier component and the distance from the wavelength of the carrier component to the center wavelength of the optical filter 11 may be stored in, for example, a ROM (not illustrated) included in a controller 10. The optical filter controller 14 may then control the transmission characteristic of the optical filter 11 by reading out the information stored in the ROM.

As described above, in the fifth embodiment, the optical filter controller 14 controls the transmission characteristic of the optical filter 11 by changing the attenuation amount of the power of the optical signal passing through the optical filter 11. In addition, the optical power analyzer 13 detects a change in the power in response to a change in the attenuation amount of the power of the optical signal. When a change in the power of the optical signal is detected, the optical filter controller 14, in turn, controls the transmission characteristic of the optical filter 11 based on the attenuation amount of the power of the optical signal and the difference between the wavelength for which a change in the power of the optical signal is detected and the center wavelength of the optical signal passing through the optical filter 11.

As a consequence, also in the modified example of the fifth embodiment, it is possible to bring about effects similar to those in the first embodiment described above. In addition, the following effect may be obtained.

By decreasing the ATT amount to an extent which does not affect optical signals being transmitted in the optical transmission system 1, it is possible, during the transmission of optical signals in the optical transmission system 1, to perform the processing of controlling the optical filter 11 without affecting the optical signal being transmitted.

Other Embodiments

The disclosed technique is not limited to the embodiments described above and may be applied by being modified in various forms within a scope not deviating from the gist of the embodiments. The constituents and the operations in the embodiments may be included and excluded as appropriate, or may be combined as appropriate. For example, the third embodiment described above may be combined with the first embodiment, the modified example of the first embodiment, the second embodiment, the fourth embodiment, or the fifth embodiment.

For example, in the embodiments described above, the optical filter controller 14 may control the transmission characteristic of an optical filter 11 whose transmission characteristic is programmably variable by controlling the optical filter 11 to roughly shaping the optical signal spectrum. Thereafter, the optical filter controller 14 may control the transmission characteristic of the optical filter 11 by adjusting the oscillation wavelength of the optical signal through control of temperature or injection current, and thereby finely adjusting the shape of the optical signal spectrum.

For example, in the embodiments described above, the optical filter controller 14 may control the transmission characteristic of the optical filter 11 by tracking a temperature change around the optical filter 11. The optical filter controller 14 may control the transmission characteristic of the optical filter 11 by dithering the transmission characteristic of the optical filter 11 in the wavelength direction or the power direction based on the temperature change. This allows the optical filter 11 to be controlled while the optical transmission system 1 or 1*a* is in operation.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmission system comprising:
   an optical transmitter configured to transmit an optical signal modulated with a discrete multi-tone (DMT) drive signal;
   a wavelength tunable filter capable of changing a wavelength of the optical signal input from the optical transmitter;
   a power monitor configured to monitor a power of the optical signal passed through the wavelength tunable filter; and
   at least one processor configured to:
   set a center wavelength of the wavelength tunable filter,
   shift the center wavelength,
   detect a change in the power monitored by the power monitor,
   identify an optical main carrier component of the optical signal based on the change in the power, and
   control a relative relationship between a transmission characteristic of the wavelength tunable filter and a wavelength of the optical main carrier component so that the optical main carrier component is included in the optical signal and one of an upper sideband and a lower sideband of the optical signal is at least partially removed by the wavelength tunable filter.

2. The optical transmission system according to claim 1, wherein the at least one processor controls the relative relationship:
   to shift a wavelength band of an optical signal at which the optical signal passes through the wavelength tunable filter to a long-wavelength side, and
   to shift the wavelength band of the optical signal at which the optical signal passes through the wavelength tunable filter to a short-wavelength side, when the change in the power resulting from an intensity ratio of a power of the optical main carrier component to a power of a DMT modulation component that is a component other than the optical main carrier component in the optical signal passed through the wavelength tunable filter is detected.

3. The optical transmission system according to claim 1, wherein the at least one processor controls the relative relationship:
to narrow a wavelength bandwidth of the optical signal at which the optical signal passes through the wavelength tunable filter, and
widen the wavelength bandwidth of the optical signal at which the optical signal passes through the wavelength tunable filter, when the change in the power resulting from an intensity ratio of a power of the optical main carrier component to a power of a DMT modulation component that is a component other than the optical main carrier component in the optical signal passed through the wavelength tunable filter is detected.

4. The optical transmission system according to claim 1, wherein the at least one processor controls the transmission characteristic of the wavelength tunable filter:
to set a passband of the wavelength tunable filter so that the passband includes a wavelength band where transmittance is partly relatively low within a wavelength band of the optical signal, and
to include, when a wavelength band where the power of the optical signal passed through the wavelength tunable filter is relatively low is detected, the detected wavelength band of the optical signal in a vestigial sideband obtained by the removing the one of the upper sideband and the lower sideband of the optical signal.

5. The optical transmission system according to claim 1, wherein the at least one processor controls the relative relationship to set a passband of the wavelength tunable filter to be a passband of the wavelength tunable filter at a time when a change in the power of the optical signal passed through the wavelength tunable filter by detecting an extremal of a deterioration amount of the power is detected, in a case where a width of the passband of the wavelength tunable filter is changed within a range where the deterioration amount is equal to or less than a predetermined amount.

6. The optical transmission system according to claim 1, wherein the at least one processor controls the transmission characteristic of the wavelength tunable filter:
to change an attenuation amount of the power of the optical signal passing through the wavelength tunable filter, and
based on the attenuation amount and a difference between a wavelength for which the change in the power is detected and a center wavelength of the optical signal passing through the wavelength tunable filter.

7. The optical transmission system according to claim 1, further comprising:
a plurality of optical transmitters configured to transmit a plurality of optical signals having different wavelengths; and
a wavelength multiplexing transmitter configured to multiplex the plurality of optical signals transmitted from the plurality of optical transmitters so as to generate a wavelength-multiplexed optical signal,
wherein the wavelength tunable filter receives the wavelength-multiplexed optical signal, and
wherein the at least one processor controls the relative relationship on at least one of the plurality of optical signals included in the wavelength-multiplexed optical signal.

8. A controller for a wavelength tunable filter capable of changing a wavelength of an optical signal modulated with a discrete multi-tone (DMT) drive signal, the controller comprising:
a power monitor configured to monitor a power of the optical signal passed through the wavelength tunable filter; and
at least one processor configured to:
set a center wavelength of the wavelength tunable filter, shift the center wavelength,
detect a change in the power monitored by the power monitor,
identify an optical main carrier component of the optical signal based on the change in the power, and
control a relative relationship between a transmission characteristic of the wavelength tunable filter and a wavelength of the optical main carrier component so that the optical main carrier component is included in the optical signal and one of an upper sideband and a lower sideband of the optical signal is at least partially removed by the wavelength tunable filter.

9. The controller according to claim 8, wherein the at least one processor controls the relative relationship:
to shift a wavelength band of an optical signal at which the optical signal passes through the wavelength tunable filter to a long-wavelength side, and
to shift the wavelength band of the optical signal at which the optical signal passes through the wavelength tunable filter to a short-wavelength side, when the change in the power resulting from an intensity ratio of a power of the optical main carrier component to a power of a DMT modulation component that is a component other than the optical main carrier component in the optical signal passed through the wavelength tunable filter is detected.

10. The controller according to claim 8, wherein the at least one processor controls the relative relationship:
to narrow a wavelength bandwidth of the optical signal at which the optical signal passes through the wavelength tunable filter, and
widen the wavelength bandwidth of the optical signal at which the optical signal passes through the wavelength tunable filter, when the change in the power resulting from an intensity ratio of a power of the optical main carrier component to a power of a DMT modulation component that is a component other than the optical main carrier component in the optical signal passed through the wavelength tunable filter is detected.

11. The controller according to claim 8, wherein the at least one processor controls the transmission characteristic of the wavelength tunable filter:
to set a passband of the wavelength tunable filter so that the passband includes a wavelength band where transmittance is partly relatively low within a wavelength band of the optical signal, and
to include, when a wavelength band where the power of the optical signal passed through the wavelength tunable filter is relatively low is detected, the detected wavelength band of the optical signal in a vestigial sideband obtained by the removing the one of the upper sideband and the lower sideband of the optical signal.

12. The controller according to claim 8, wherein the at least one processor controls the relative relationship to set a passband of the wavelength tunable filter to be a passband of the wavelength tunable filter at a time when a change in the power of the optical signal passed through the wavelength tunable filter by detecting an extremal of a deterioration amount of the power is detected, in a case where a width of the passband of the wavelength tunable filter is changed within a range where the deterioration amount is equal to or less than a predetermined amount.

13. The controller according to claim 8, wherein the at least one processor controls the transmission characteristic of the wavelength tunable filter:
to change an attenuation amount of the power of the optical signal passing through the wavelength tunable filter, and
based on the attenuation amount and a difference between a wavelength for which the change in the power is detected and a center wavelength of the optical signal passing through the wavelength tunable filter.

14. The controller according to claim 8, wherein the at least one processor controls the relative relationship on at least one of a plurality of optical signals having different wavelengths, the plurality of optical signals being multiplexed in a wavelength-multiplexed optical signal.

15. A control method of a wavelength tunable filter capable of changing a wavelength of an optical signal modulated with a discrete multi-tone (DMT) drive signal, the control method comprising:
monitoring a power of the optical signal passed through the wavelength tunable filter;
setting a center wavelength of the wavelength tunable filter;
shifting the center wavelength;
detecting a change in the power monitored by the power monitor;
identifying an optical main carrier component of the optical signal based on the change in the power;
controlling a relative relationship between a transmission characteristic of the wavelength tunable filter and a wavelength of the optical main carrier component so that the optical main carrier component is included in the optical signal and one of an upper sideband and a lower sideband of the optical signal is at least partially removed by the wavelength tunable filter, by at least one processor.

16. The control method according to claim 15, wherein the at least one processor controls the relative relationship:
to shift a wavelength band of an optical signal at which the optical signal passes through the wavelength tunable filter to a long-wavelength side, and
to shift the wavelength band of the optical signal at which the optical signal passes through the wavelength tunable filter to a short-wavelength side, when the change in the power resulting from an intensity ratio of a power of the optical main carrier component to a power of a DMT modulation component that is a component other than the optical main carrier component in the optical signal passed through the wavelength tunable filter is detected.

17. The controller according to claim 15, wherein the at least one processor controls the relative relationship:
to narrow a wavelength bandwidth of the optical signal at which the optical signal passes through the wavelength tunable filter, and
widen the wavelength bandwidth of the optical signal at which the optical signal passes through the wavelength tunable filter, when the change in the power resulting from an intensity ratio of a power of the optical main carrier component to a power of a DMT modulation component that is a component other than the optical main carrier component in the optical signal passed through the wavelength tunable filter is detected.

18. The controller according to claim 15, wherein the at least one processor controls the transmission characteristic of the wavelength tunable filter:
to set a passband of the wavelength tunable filter so that the passband includes a wavelength band where transmittance is partly relatively low within a wavelength band of the optical signal, and
to include, when a wavelength band where the power of the optical signal passed through the wavelength tunable filter is relatively low is detected, the detected wavelength band of the optical signal in a vestigial sideband obtained by the removing the one of the upper sideband and the lower sideband of the optical signal.

19. The controller according to claim 15, wherein the at least one processor controls the relative relationship to set a passband of the wavelength tunable filter to be a passband of the wavelength tunable filter at a time when a change in the power of the optical signal passed through the wavelength tunable filter by detecting an extremal of a deterioration amount of the power is detected, in a case where a width of the passband of the wavelength tunable filter is changed within a range where the deterioration amount is equal to or less than a predetermined amount.

20. The controller according to claim 15, wherein the at least one processor controls the transmission characteristic of the wavelength tunable filter:
to change an attenuation amount of the power of the optical signal passing through the wavelength tunable filter, and
based on the attenuation amount and a difference between a wavelength for which the change in the power is detected and a center wavelength of the optical signal passing through the wavelength tunable filter.

* * * * *